US012143516B2

(12) United States Patent
Angelo et al.

(10) Patent No.: US 12,143,516 B2
(45) Date of Patent: Nov. 12, 2024

(54) HARDWARE BASED AUTHENTICATION AND AUTHORIZATION OF NETWORKED NODES

(71) Applicant: Raytheon Company, Waltham, MA (US)

(72) Inventors: Nick Angelo, McKinney, TX (US); Michelle Moholt, Gunter, TX (US)

(73) Assignee: Raytheon Company, Tewksbury, MA (US)

( * ) Notice: Subject to any disclaimer, the term of this patent is extended or adjusted under 35 U.S.C. 154(b) by 264 days.

(21) Appl. No.: 17/649,422

(22) Filed: Jan. 31, 2022

(65) Prior Publication Data

US 2023/0283487 A1 Sep. 7, 2023

(51) Int. Cl.
*H04L 9/32* (2006.01)
*H04L 9/08* (2006.01)

(52) U.S. Cl.
CPC .......... *H04L 9/3278* (2013.01); *H04L 9/0825* (2013.01); *H04L 9/085* (2013.01); *H04L 9/0866* (2013.01)

(58) Field of Classification Search
CPC ..... H04L 9/3278; H04L 9/0825; H04L 9/085; H04L 9/0866
See application file for complete search history.

(56) References Cited

U.S. PATENT DOCUMENTS 8,001,584 B2 *  8/2011  Lortz .................... H04L 63/162
                                                          713/168
9,197,422 B2 * 11/2015  Irwin .................... H04L 9/0866
10,445,531 B2 * 10/2019  Jennings ................... G09C 1/00
10,452,872 B2 * 10/2019  Jennings ................... G09C 1/00
11,218,316 B2 *  1/2022  Wentz ....................  H04L 9/085
(Continued)

FOREIGN PATENT DOCUMENTS

CN          111818039 A       10/2020

OTHER PUBLICATIONS

Delvaux et al., "Secure Lightweight Entity Authentication with Strong PUFs: Mission Impossible?;" PowerPoint Presentation from Conference on Cryptographic Hardware and Embedded Systems (CHES 2014); Jan. 2017; 20 Pages.
(Continued)

*Primary Examiner* — J. Brant Murphy
(74) *Attorney, Agent, or Firm* — Schwegman Lundberg & Woessner, P.A.

(57) ABSTRACT

A method of controlling access to a network includes receiving, from a node, a request to access the network. A challenge is sent to the node, the challenge configured to elicit a node fingerprint from the node. The node fingerprint is based on the challenge and on unique characteristic data of a physically unclonable function (PUF), at the node. An expected fingerprint is generated for the node based on the challenge and on characteristic data information associated with the unique characteristic data of the PUF. The characteristic data information is accessed from a location that is independent of and separate from the node. The node is authenticated to the network, to allow the node to access to the network, if the received node fingerprint matches the expected fingerprint. The first node is denied any access to the network if the received node fingerprint does not match the expected fingerprint.

20 Claims, 10 Drawing Sheets

(56) References Cited

U.S. PATENT DOCUMENTS

| | | | | |
|---|---|---|---|---|
| 2013/0298211 | A1* | 11/2013 | M'Raihi | H04L 63/08 |
| | | | | 726/7 |
| 2017/0344760 | A1* | 11/2017 | Jennings | G06F 21/75 |
| 2017/0344761 | A1* | 11/2017 | Jennings | H04L 9/0866 |
| 2018/0206117 | A1* | 7/2018 | Stahl | H04W 12/35 |
| 2019/0266313 | A1* | 8/2019 | Babuscov | G06F 21/64 |
| 2019/0311126 | A1* | 10/2019 | Areno | H04L 9/0866 |
| 2020/0295954 | A1* | 9/2020 | Cambou | H04L 9/0866 |
| 2021/0344516 | A1* | 11/2021 | Haidous | H04L 63/0428 |
| 2023/0180002 | A1* | 6/2023 | Hwang | H04L 63/062 |
| | | | | 726/6 |

OTHER PUBLICATIONS

Korenda et al., "A Proof of Concept SRAM-based Physically Unclonable Function (PUF) Key Generation Mechanism for IoT Devices;" SECON 2019 Workshop on Security Trust and Privacy in Emerging Cyber-Physical Systems; Apr. 21, 2019; 8 Pages.

Nikolopoulos, "Remote Quantum-Safe Authentication of Entities with Physical Unclonable Functions;" Journal of Photonics, vol. 8, No. 7; Jan. 2021; 9 Pages.

Pelosi, "How the DICE Standard Delivers Strong Security for IoT Devices;" Blog Post on www.electronicproducts.com; Posted on Aug. 21, 2020; 10 Pages.

Rührmair et al., "Strong PUFs: Models, Constructions and Security Proofs;" Chapter from *Towards Hardware-Intrinsic Security*; First online Oct. 12, 2010; 19 Pages.

Shamsoshoara et al., "A Survey on Physical Unclonable Function (PUF)-based Security Solutions for Internet of Things;" Computer Networks, vol. 183; Dec. 24, 2020; 78 Pages.

* cited by examiner

HARDWARE BASED AUTHENTICATION AND AUTHORIZATION OF NETWORKED NODES

FIELD

Embodiments of the disclosure generally relate to devices, systems, and methods for security of network nodes. More particularly, the disclosure describes embodiments relating to devices, systems, and methods that apply and implement physically unclonable functions (PUF) to improve verification, authentication, and security of networks of nodes.

BACKGROUND

Computer network technologies, especially widespread availability of wireless technologies, have been key to enabling proliferation of the so-called the Internet of Things (IoT), which enables many billions of "things," including but not limited to machines, objects, devices, smart phones, computers, smart watches, automobiles, home appliances, personal electronic assistants, cameras, speakers, tracking devices, etc., to interconnect with each other, collect data and respond to the collected data, and/or to share the data. Even humans and animals can wear or have implanted devices capable of communicating to a computer network. Availability of wireless network technology such as 5G and the like are helping to further expand the ability of networked computer devices to be dynamic and mobile, enabling the provision of multiple new services and capabilities for many types of users in multiple industries, including medical, military, commercial, financial, industrial, and the like. Further, the data collected by networked computer devices can be a bridge to so-called Big Data systems, as well. IoT devices, in particular, are driving much of the growth of computer networks and currently account for more than 30% of all network-connected enterprise endpoints. It is expected that by 2023, 70% of automobiles will be connected to the internet and be part of the IoT, and as of 2027, there will be 41 billion IoT Devices by 2027.

SUMMARY

The following presents a simplified summary in order to provide a basic understanding of one or more aspects of the embodiments described herein. This summary is not an extensive overview of all of the possible embodiments and is neither intended to identify key or critical elements of the embodiments, nor to delineate the scope thereof. Rather, the primary purpose of the summary is to present some concepts of the embodiments described herein in a simplified form as a prelude to the more detailed description that is presented later.

An emerging challenge for networked devices, such as the IoT and 5G technologies, is ensuring security and authenticity of the connected "things" and other network nodes. At present, there is no unified security, identification and authentication standard for the IoT, even as new products join the IoT every day and multiple 5G-enabled devices are being added to those networks. Even conventional computer networks have to deal with attempts at phishing, spoofing, attack, and other unwanted intrusions. While there are many techniques and advances that attempt to increase the security of authenticating users (e.g., two factor authentication, biometric authentication), increasing the security of the devices themselves, especially those that can access networks autonomously, is equally important.

With the advancement and proliferation of networked devices (including the IoT and IoT-connected devices, 5G devices, and multiple other kinds of computer networks) establishing the end node identity and authenticity of devices/nodes connected to computer systems, is becoming increasingly important to ensure network security yet also increasingly difficult, allowing rogue devices (whether or not directly controlled by rogue actors) to use devices to impersonate legitimate entities seeking disruption, monetary gains, or theft of information by exploiting network security vulnerabilities. This issue is compounded even further when the end point network devices must contain and/or process, sensitive information (e.g., financial information, personal credentials, medical information, etc.) making it possible to attack the device itself and/or compromise the information.

The integrity and security of nodes coupled to computer networks, and communications links to nodes, has long been an important aspect of ensuring security communications and computer networks. Although there are numerous authentication schemes to authenticate users, authenticating devices (especially autonomous devices which can operate without direct user control) can present unique challenges. In many computer networks, end nodes are authenticated and identified in various ways. For example, one industry solution for authenticating network nodes has revolved around using a Trusted Platform Module (TPM) device for hardware based key generation and cryptographic support. TPMs can be helpful in ensuring cryptographic security during boot of a system, to help prevent access to information on a system if a system is stolen, and to help ensure authentication credentials are legitimate. However, TPM devices typically must be designed into a system (for example, as a discrete device or part of firmware) and their complexity and cost can mean that many internet connected devices, especially fielded devices, do not include a TPM module. In addition, some types of network nodes (especially IoT devices) can be cost-sensitive and resource-constrained devices (e.g., wireless microcontrollers (MCUs)) that are not able implement some security standards and technologies, such as TPM and/or those applicable to desktop or server environments.

Another solution, for systems lacking a TPM module, includes reliance on techniques such as various certificate protocols and types of software (SW) implementations of cryptographic functions. However, certificate protocols (and other protocols) can be vulnerable to issues such as spoofing. For example, an attacker can provide a spoofed code-signing certificate to sign a malicious executable, to make it appear to a user accessing that file, that the attacker's file was from a trusted, legitimate source. Spoofing also can involve spoofing of internet protocol (IP) and/or media access control (MAC) addresses, which can allow attackers to bypass some types of filters to have unauthorized access to a network. However, some types of nodes, especially those that comprise IoT devices, have significantly limited computational power available to them, which is a constraint that limits the node's ability to use some security measures such as certain cryptographic functions and firewalls.

Communications links themselves also can have security vulnerabilities. Communications links in computer networks that use the internet rely on technologies such as Hypertext Transfer Protocol Secure (HTTPS), a protocol where encrypted HTTP data is transferred over a secure connection, such as secure socket layers (SSL) and/or transport level security (TLS). Using HTTPS with SSL/TLS, effectively combines asymmetric and symmetric cryptography, helping to establish secrecy and non-repudiation, which can be vital when sensitive personal information (e.g., credit card numbers) is sent via insecure channels (e.g., internet). This also helps to maintain the privacy and integrity of data and to authenticate and validate websites. However, SSL/TLS/HTTPs all can be vulnerable to compromise and attacks such as "man in the middle attacks.," wherein attackers can intercept even encrypted communications. One way that "man in the middle attacks" are also enabled is when nodes are unable to authenticate each other. Another type of spoofing attack can involve a node spoofing its identity in communication with one or more other nodes node (e.g., caller identification (ID) spoofing, spam text messages, etc.).

Devices, such as devices that are part of the IoT, also need to be able to protect their own data stored therein (e.g., certificates and/or cryptographic keys, in some instances) to make sure that they cannot be copied to a rogue device, impersonating a genuine one, as well as protecting sensitive data and secure communications. This protection typically is provided by certificates and cryptographic keys, but there is a need to prevent intrusion and copying of this information.

There is a need for ways to establish and authenticate the identity of devices/nodes on a computer network, including devices connected to 5G and to the IoT, especially self-authenticating devices (e.g., devices that can authenticate themselves to a network without requiring a user or other entity to enter a password or present a secure token), to help ensure that the ability of these devices to access networks, to provide information, and to communicate over the network, is valid. In particular, there can be a need for secure and automatic self-authentication to a computer network for devices that need to connect securely to a network but where user input of a password is inconvenient, difficult, and/or impossible, such as for various types of IoT devices (e.g., a sensor embedded in a vehicle, a medical device embedded into and/or monitoring a patient, an internet enabled security system that is monitoring an unoccupied building, etc.).

In a first aspect, a system for controlling access to a network is provided, the system comprising a processor and a memory in operable communication with the processor. The memory stores instructions thereon that when executed by the processor, cause the processor to: receive from a first node, a request to access a network; send to the first node a first challenge configured to elicit a first node fingerprint from the first node, the first node fingerprint based on the first challenge and on unique characteristic data of a physically unclonable function (PUF), at the first node; generate an expected fingerprint for the first node based on the first challenge and on characteristic data information associated with the unique characteristic data of the PUF, wherein the processor accesses the characteristic data information from a location that is independent of and separate from the first node; receive, from the first node, in response to the first challenge, the first node fingerprint; authenticate the first node to the network, to allow the first node to access to the network, if the first node fingerprint matches the expected fingerprint; and deny the first node any access to the network if the first node fingerprint does not match the expected fingerprint.

In some embodiments, if the first node fingerprint matches the expected fingerprint, the memory stores further instructions thereon that when executed by the processor, cause the processor to send a second challenge to the first node. The second challenge is configured to enable generation of a first pair of symmetric keys usable to encrypt communications between the first node and the network, the first pair of symmetric keys comprising a first symmetric key and a second symmetric key, wherein: the processor generates the first symmetric key based on the second challenge sent to the first node and on the characteristic data information that the processor accesses; and the second challenge is configured to enable the first node to use the second challenge to generate the second symmetric key based on the second challenge and on the unique characteristic data of the PUF at the first node, wherein the unique characteristic data of the PUF at the first node is close enough to the characteristic data information that the processor accesses to ensure that second symmetric key is identical to the first symmetric key.

In some embodiments, the memory stores further instructions thereon that when executed by the processor, cause the processor to monitor communications between the first node and the network and to revoke the access of the first node to the network if at least one of the following conditions exists: the first node sends a communication to the network that is not encrypted using the second symmetric key; the first node fails to re-authenticate itself to the network, in response to a re-authentication challenge; and the first node fingerprint no longer matches the expected fingerprint.

In some embodiments, revoking the access of the first node to the network comprises physically disconnecting the first node from the network. In some embodiments, if a predetermined condition exists, the memory stores instructions thereon that when executed by the processor, cause the processor to establish a second pair of symmetric keys for communication with the first node, the second pair of symmetric keys configured to replace the first pair of symmetric keys, wherein the predetermined condition comprises at least one of: a second node requests access to the network and is denied access to the network; a second node fingerprint, for a second node, does not match an expected second node fingerprint for that second node; a second node, which has been authenticated to the network, fails to re-authenticate itself to the network, in response to a re-authentication challenge sent to the second node; and a second node, which has been authenticated to the network, sends a communication to the network using an incorrect symmetric key.

In some embodiments, at least one of the first challenge and second challenge comprises a nonce. In some embodiments, the PUF comprises a strong PUF. In some embodiments, the memory stores further instructions thereon that when executed by the processor, cause the processor to enroll the first node to the network in advance of receiving first node's request to access the network by storing a set of data associated with the first node, the set of data comprising the characteristic data information. In some embodiments, the network is configured to use the expected fingerprint and the first node fingerprint to enable the first node to automatically self-authenticate, as required, to the network, without user intervention. In some embodiments, at least one of the first node fingerprint and the expected fingerprint are generated using helper data that is associated with the PUF. In some embodiments, the first node corresponds to an Internet of Things (IoT) device.

In another aspect, a method of controlling access to a network is provided. A request to access a network is received from a first node. A first challenge is sent to the first node, wherein the first challenge is configured to elicit a first node fingerprint from the first node, the first node fingerprint based on the first challenge and on unique characteristic data of a physically unclonable function (PUF), at the first node. An expected fingerprint is generated for the first node based on the first challenge and on characteristic data information associated with the unique characteristic data of the PUF, wherein the characteristic data information is accessed from a location that is independent of and separate from the first node. In response to the first challenge, the first node fingerprint is received from the first node. The first node is authenticated to the network, to allow the first node to access to the network, if the first node fingerprint matches the expected fingerprint. The first node is denied any access to the network if the first node fingerprint does not match the expected fingerprint.

In some embodiments, a second challenge is sent to the first node, the second challenge configured to enable generating a first pair of symmetric keys usable to encrypt communications between the first node and the network, the first pair of symmetric keys comprising a first symmetric key and a second symmetric key. The first symmetric key is generated based on the second challenge sent to the first node and on the characteristic data information. The second challenge is configured to enable the first node to use the second challenge to generate the second symmetric key based on the second challenge and on the unique characteristic data of the PUF at the first node, wherein the unique characteristic data of the PUF at the first node is close enough to the characteristic data information to ensure that second symmetric key is identical to the first symmetric key.

In some embodiments, the access of the first node to the network is revoked if at least one of the following conditions exists: the first node sends a communication to the network that is not encrypted using the second symmetric key; the first node fails to re-authenticate itself to the network, in response to a re-authentication challenge; and the first node fingerprint no longer matches the expected fingerprint. In some embodiments, revoking access of the first node to the network further comprising physically disconnecting the first node from the network.

In some embodiments, the method includes establishing a second pair of symmetric keys for communication with the first node, the second pair of symmetric keys configured to replace the first pair of symmetric keys if a predetermined condition exists. The predetermined condition comprises at least one of: a second node requests access to the network and is denied access to the network; a second node fingerprint, for a second node, does not match an expected second node fingerprint for that second node; a second node, which has been authenticated to the network, fails to re-authenticate itself to the network, in response to a re-authentication challenge sent to the second node; and a second node, which has been authenticated to the network, sends a communication to the network using an incorrect symmetric key.

In a further aspect, a method of authenticating to a network is provided. A node sends a request to access a network. A first challenge is received at the node, the first challenge configured to elicit a first node fingerprint from the first node, the first node fingerprint based on the first challenge and on unique characteristic data of a physically unclonable function (PUF), at the first node. The first node fingerprint is sent to the network. Authentication of the first node to the network is received only if the first node fingerprint matches an expected fingerprint generated at the network, wherein the expected fingerprint is generated based on the first challenge and on characteristic data information associated with the unique characteristic data of the PUF, wherein the characteristic data information is accessed from a location that is independent of and separate from the first node.

In some embodiments, a second challenge is received at the first node, the second challenge configured to enable the first node to generate a second symmetric key, the second symmetric key being part of a first pair of symmetric keys usable to encrypt communications between the first node and the network, the first pair of symmetric keys comprising a first symmetric key used at the network and the second symmetric key used at the node. The second challenge is configured to enable the first node to use the second challenge to generate the second symmetric key based on the second challenge and on the unique characteristic data of the PUF at the first node. The unique characteristic data of the PUF at the first node is close enough to the characteristic data information to ensure that the second symmetric key is identical to the first symmetric key that is generated at the network based on the second challenge sent to the first node and on the characteristic data information.

In some embodiments, the node receives from the network a new second symmetric key to replace the second symmetric key that the first node generated if a predetermined condition exists. The predetermined condition comprises at least one of: a second node requests access to the network and is denied access to the network; a second node fingerprint, for a second node, does not match an expected second node fingerprint for that second node; a second node, which has been authenticated to the network, fails to re-authenticate itself to the network, in response to a re-authentication challenge sent to the second node; and a second node, which has been authenticated to the network, sends a communication to the network using an incorrect respective symmetric key for that second node.

In some embodiments, the first node comprises an Internet of Things (IoT) device.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the claims included herein.

Details relating to these and other embodiments are described more fully herein.

BRIEF DESCRIPTION OF THE DRAWINGS

The advantages and aspects of the described embodiments, as well as the embodiments themselves, will be more fully understood in conjunction with the following detailed description and accompanying drawings, in which.

The drawings are not to scale, emphasis instead being on illustrating the principles and features of the disclosed embodiments. In addition, in the drawings, like reference numbers indicate like elements.

DETAILED DESCRIPTION

Figure 1:
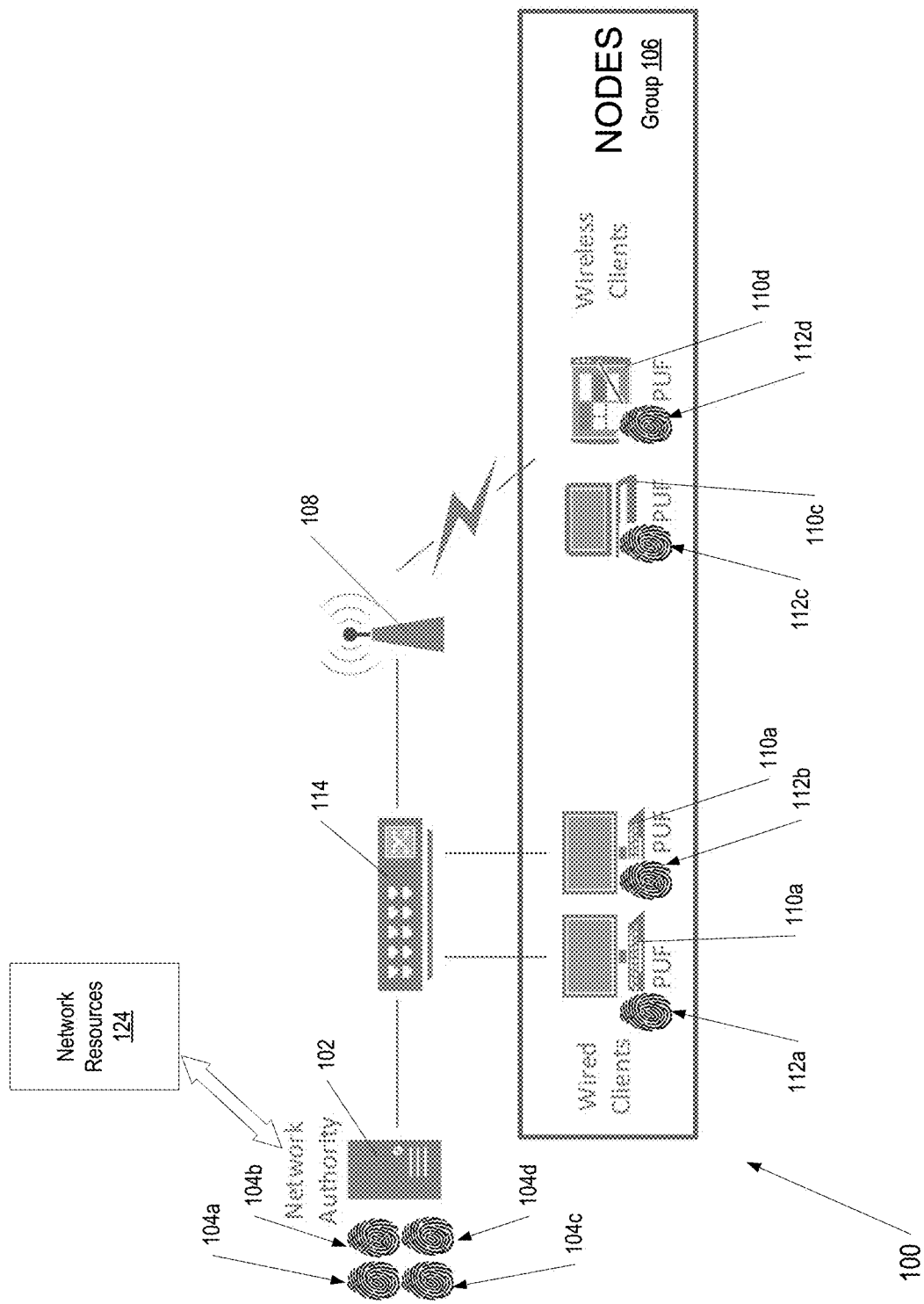
FIG. 1 is an illustrative block diagram of a first computer network implemented in accordance with one embodiment.

Before describing details of the particular systems, devices, and methods, it should be observed that the concepts disclosed herein include but are not limited to a novel structural combination of components and circuits, and not necessarily to the particular detailed configurations thereof. Accordingly, the structure, methods, functions, control and arrangement of components and circuits have, for the most part, been illustrated in the drawings by readily understandable and simplified block representations and schematic diagrams, in order not to obscure the disclosure with structural details which will be readily apparent to those skilled in the art having the benefit of the description herein.

As described herein, at least some embodiments provide a system and method to establish an identity of a device identity and to self-secure a network against un-authorized devices. Certain embodiments provide a unique application of a hardware based Physical Unclonable Function (PUF), to eliminate the need for public-key cryptography directly establishing symmetric keys and authenticity of tokens. Certain embodiments provide an approach for increasing system security by eliminating vulnerabilities related to public key encryption (PKI) and providing means to identify and prune rogue devices.

In some embodiments, herein, security of computer networks, especially network nodes, makes use of a challengeable Physically Unclonable Function (PUF) (defined further and more extensively herein) at the node, to authenticate and generate key material used during authentication, to help authenticate the network node to a network authority. In brief, a PUF is a hardware based construct that takes advantage of manufacturing imperfections (an inherent source of entropy in devices) to extract or generate a unique identifier that is associated with a device. PUFs have been used to verify and detect modifications to hardware and control operations based on the information the PUF provides (see, e.g., commonly assigned U.S. Pat. No. 10,452,872, entitled "DETECTION SYSTEM FOR DETECTING CHANGES TO CIRCUITRY AND METHOD OF USING SAME," and also commonly assigned U.S. Pat. No. 10,445,531, entitled, "AUTHENTICATION SYSTEM AND METHOD," each of which is hereby incorporated by reference). In certain embodiments herein, these PUF features and/or other features of PUFs are further applied extended to use the PUF as a part of a network authentication arrangement for nodes seeking to access a computer network, wherein PUF information is used to help create symmetric encryption keys used for nodes to communicate with the network authority over the computer network, where the keys can be computed individually at each of the network authority and the nodes, based on PUF data, without requiring the sharing of keys themselves over the computer network. This is explained further below.

In certain embodiments, the approaches described herein provide provides means for the network authority to challenge the network endpoint (e.g., node), such that if and only if the PUF at the endpoint generates the correct key/response, will the network authority allow the endpoint device to communicate on the network. In some embodiments, the solution enables a central (or federated) authority (e.g., the network authority) to automatically prune network nodes from a network, to help remove from the network bad actors who do not authenticate correctly, therefore eliminating the ability to mimic legitimate network nodes. Furthermore, in certain embodiments, the solution provides a way to generate secure keys without sharing or storing sensitive information. In some embodiments, the PUFs at the node that are used for authentication to the network, also can be usable to protect information stored on the node itself, and/or to protect a node itself during other node processes, such as during booting. For example, in some embodiments, the PUF used for device authentication, also can serve, effectively as a physical security anchor or "hardware root of trust" for a node or device. For example, the PUF used for authentication can also be used to generate, in certain embodiments, a device-unique and unclonable cryptographic root key that can be used to protect the application keys and certificates of a device.

The following detailed description is provided, in at least some examples, using the specific context of a computer network having a network authority entity and a plurality of nodes, but those of skill in the art will appreciate that this exemplary environment can be generally illustrative of any type of a system or network where there needs to be controls and authentication involved in allowing devices, modules, systems, etc. (collectively, "nodes")., to gain access to the network, where a given node is configured to include a challengeable and unique physically unclonable function (PUF) that is a part of the node itself.

For convenience, certain introductory concepts and terms used in the specification are collected here. The following terminology definitions may be helpful in understanding one or more of the embodiments described herein and should be considered in view of the descriptions herein, the context in which they appear, and knowledge of those of skill in the art:

"Computer network" refers at least to methods and types of communication that take place between and among components of a system that is at least partially under computer/processor control, including but not limited to wired communication, wireless communication (including radio communication, Wi-Fi networks, BLUETOOTH communication, etc.), cloud computing networks, telephone systems (both landlines and wireless), networks communicating using various network protocols known in the art, military networks (e.g., Department of Defense Network (DDN)), centralized computer networks, decentralized wireless networks (e.g., Helium, Oxen), networks contained within systems (e.g., devices that communicate within and/or to/from a vehicle, aircraft, ship, weapon, rocket, etc.), distributed devices that communicate over a network (e.g., Internet of Things), and any network configured to allow a device/node to access information stored elsewhere, to receive instructions, data or other signals from another device, and to send data or signals or other communications from one device to one or more other devices.

"Network Authority," refers at least to a trusted secure host that manages and/or controls at least some, and advantageously all, aspects of accessing and interacting with a network, including managing one or more of data, security, permissions, credentials, authentications (including challenges), authorization, revoking of access/removal of access (including but not limited to logical and/or physical removal) and physical access limitations.

"Internet of Things" (IoT) refers at least a broad range of internet-connected devices capable of communicating with other devices and networks, where IoT devices can include devices that themselves can process data as well as devices that are only intended to gather and transmit data elsewhere for processing. An IoT can include a system of multiple interrelated and/or interconnected computing devices, mechanical and digital machines, objects, animals or people that are provided with unique identifiers (UIDs) and the ability to transfer data over a network without requiring human-to-human or human-to-computer interaction. Even devices implanted into humans and/or animals can enable that human/animal to be part of an IoT.

"Physical unclonable function (PUF)" at least refers to a hardware based construct that takes advantage of manufacturing imperfections (an inherent source of entropy in devices) to extract or generate a unique identifier that is associated with a component, wherein the unique identifier can serve as a "fingerprint" for the device and, due to inherent and/or unexpected and/or intentional variations in the device itself (e.g., manufacturing variations, naturally occurring physical variations, etc.) enables the "fingerprint" to be so unique that it cannot be cloned. For example, analog physical measures such as doping levels or physical dimensions can give rise to different threshold voltages of transistors, which can be quantized into a unique value that can be a PUF characteristic subject to a challenge. In another example, switching delays and other effects can be sampled and quantized to create a digital value that can be part of a PUF's response to a challenge. Due to the practical infeasibility of controlling physical parameters at this scale, the exact functionality implemented by a PUF is deemed unclonable. Thus, PUFs can be used as a security primitive to enable device-based identification, and authentication. Advantageously, PUFs are configured to be robust (stable over time), unique (such that no two PUFs are the same), easy to evaluate (to be feasibly implemented so that challenges can be formulated to the PUF in a usable manner for the application), difficult to replicate (so the PUF cannot be copied) and very difficult or impossible to predict (so the responses cannot be guessed). In some instances, PUFs can provide a low cost alternative solution for on-demand generation of cryptographic keys from the device rather than methods requiring such keys to be produced and distributed by a server and then stored in the device memory. For example, in usage of a PUF as a key generator, only a fixed number of secret bits need to be generated from the PUF. These bits can be used as symmetric key bits or used as a random seed (e.g., in combination with a challenge or with other information) to generate a public/private key pair, e.g., in a secure processor. A PUF also may be created or derived using one or more physical properties of a device or physical performance of a device, where such physical properties and randomness are intentionally added during manufacture. That is, for a given PUF, its source of uniqueness can be created in an explicit manner, such as through the deliberate addition of extra manufacturing steps that add unique aspects, or created in an implicit/intrinsic manner, as part of the typical manufacture processes variations, as noted above. Some PUFs examine how the source of uniqueness interacts with, or influences, an electronic signal to derive the unique signature measurement for the PUF; for example, a transit time for a signal to traverse a given path within a device. In certain embodiments herein, the PUF is capable of creating a key utilizing the challenge received from the remote entity, and its own response.

"Challengeable PUF," at least refers to a PUF that is capable of accepting an input (e.g., an input from a user, sometimes referred to as a "challenge," where the user can be any other entity, including a human, another device, another circuit within the same device, a software module, etc.) and wherein the challenge generates unique responses to the input, based on the physical fingerprint of the device. The unique challenge-response behavior of a particular PUF bares a strong resemblance to biometric identifiers from human beings. Using a challengeable PUF, the identity and authenticity of a device can be established, helping to eliminate any means of spoofing the device. In some embodiments, in a challengeable PUF, the challenge configures the PUF (e.g., by selecting one configuration of physical properties from a large set of possible combinations) and the response depends on the challenge and the physical properties of the PUF. Advantageously, in certain embodiments herein, the PUF at the node is a so-called "strong PUF," shall be strong, meaning that the PUF has an exponentially large challenge/response space.

"Strong PUF" refers at least to a PUF having an exponentially large challenge and response space, which means that a complete determination/measurement of all challenge-response pairs within a limited time frame (such as several days or even weeks) is effectively impossible. In addition, with a strong PUF, it is difficult for an adversary to numerically predict or guess a response of the strong PUF to a randomly selected challenge, even if the adversary has knowledge of other challenge-response pairs. Examples of strong PUFs include, but are not limited to, an optical PUF (which relies on applying a laser to an optical scattering object at a certain angle and incidence point, to produce a multi-bit interference pattern arising from complex light scattering process inside the optical scattering object), an arbiter PUFs (which uses the time difference of two delay-line signals to generate a response to a challenge), and a ring-oscillator PUF (which achieves a unique fingerprint by comparing the relative frequencies of oscillating rings composed of inverters, where the response output a single bit whose value depends on which ring is faster.) These examples are illustrative and not limiting, and those of skill in the art will be able to select an appropriate strong PUF for the embodiments herein.

"Challenge," at least refers to digital data presented to a PUF to elicit a response, where the digital data contains parameters or other instructions that cause the PUF to respond and/or produce an output in a completely unpredictable and unique manner. Advantageously, in certain embodiments herein, the challenge/response protocol for a PUF used in a network node, shall provide means to mitigate replay attacks. For example, in some embodiments, the challenge can include a random nonce number, wherein a nonce (number once) is an arbitrary number that can be used just once in a cryptographic communication, such as a random or pseudo-random number issued in an authentication protocol to ensure that old communications cannot be reused in replay attacks.

"Response," at least refers to digital data containing a unique sequence of bits that the PUF creates responsive to/due to a particular challenge, such as a parameter that is part of a challenge presented to the PUF. The type of challenge and response can, in some instances, depend on the type of PUF being used. Some PUF devices can automatically produce a response independent of a challenge; that is, the PUF may already contain random, unique information that the challenge merely needs to ask for. Consider an SRAM PUF, which is configured to leverages the inherent randomness of a block of SRAM bits as the SRAM is booted up-based on some or all of such a random block, a PUF response can be created that corresponds to a single symmetric key that's unique to the device containing that SRAM.

"Helper data," at least refers to digital data utilized by some PUF designs to stabilize and compensate the output of the PUF due to environmental effects (for example, if a PUF output varies slightly from what is expected due to ambient temperature, circuit noise, etc.). The helper data, in some embodiments, can be generated by a helper data algorithm, and can serve as a kind of post-processing or error correction to the PUF output. Consider that, for some types of PUFs, for certain classes of authentication applications, a device containing a PUF is authenticated if the regenerated response is "close enough" in Hamming distance (e.g., t minimum number of errors that could have transformed one string of bits into the other) the provisioned or predicted response, For these types of PUFs, errors in PUF responses can be forgiven up to a certain predetermined threshold, and still be considered a match. In contrast, for some other types of PUFs (e.g., for PUFs used in cryptographic applications to generate keys, the "noisy" bits need to be error corrected, with the aid of helper bits, commonly referred to as a Helper data. The greater the environmental variation a PUF is subject to, the greater the possible difference (noise) between a provisioned/predicted PUF response and a re-generated (actual) response. Thus, to make use of the physical nature of PUFs for reliable authentication, in some embodiments, a helper data algorithm or fuzzy extractor can be used to generate responses with appropriate entropy from noisy and non-uniform random PUF responses. Advantageously, in certain embodiments herein, the PUF uses helper data that contains no information or means to reverse engineer the keys generated by the PUF. In some embodiments, this helper data is also provided to a network authority as part of characteristic data it receives about a PUF, during an enrollment process, as discussed further herein.

"Root of Trust (ROT)" at least refers to a trusted computing module that provides a set of functions that are trusted by other modules in a computing environment, such as an Operating System (OS). The RoT may serve as an independent computing module providing authenticity in a computer or mobile device in which it is embedded. The term "Hardware Root of Trust (HROT)" device is used to describe a hardware device that provides ROT functions. For example, in some embodiments, a PUF can provide ROT functions to a given device. The HROT device generally provides, but is not limited to, performing device authentication to ensure that hardware has not been tampered with; verifying the authenticity of software, particularly boot images, to ensure they haven't been tampered with; providing One-Time Programmable (OTP) memory for secure key storage to facilitate encryption; and ensuring that the system is able to be brought into a known and trusted state. In some embodiments, an HROT serves as a foundation on which all secure operations of a computing system depend and contains the keys used for cryptographic functions, to help enable a secure boot process. Because an HROT is inherently trusted, it should be secure by design. Providing an HROT in hardware can enable the HROT to be substantially immune from malware attacks. Thus, in some instances, an HROT can serve as a stand-alone security module or implemented as security module within a processor or system on chip (SoC).

"Symmetric Encryption" at least refers to a data encryption technique whereby data is encrypted and decrypted using a single, secret cryptographic key. For example, the single, shared cryptographic key is used to encrypt plaintext—the data's pre-encryption or post-decryption state—and decrypt ciphertext—the data's post-encryption or pre-decryption state. Various types of symmetric encryption are known in the art and usable in at least some embodiments herein, including but not limited to AES (Advanced Encryption Standard), DES (Data Encryption Standard), IDEA (International Data Encryption Algorithm), Blowfish (Drop-in replacement for DES or IDEA), RC4 (Rivest Cipher 4), RC5 (Rivest Cipher 5), and RC6 (Rivest Cipher 6).

Unless specifically stated otherwise, those of skill in the art will appreciate that, throughout the present detailed description, discussions utilizing terms such as "opening", "configuring," "receiving,", "detecting," "retrieving," "converting", "providing,", "storing," "checking", "uploading", "sending,", "determining", "reading", "loading", "overriding", "writing", "creating". "including". "generating", "associating", and "arranging", and the like, refer to the actions and processes of a computer system or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The disclosed embodiments are also well suited to the use of other computer systems such as, for example, optical and mechanical computers. Additionally, it should be understood that in the embodiments disclosed herein, one or more of the steps can be performed manually.

Before describing in detail the particular improved systems, devices, and methods, it should be observed that the concepts disclosed herein include but are not limited to a novel structural combination of software, components, and/or circuits, and not necessarily to the particular detailed configurations thereof. Accordingly, the structure, methods, functions, control and arrangement of components and circuits have, for the most part, been illustrated in the drawings by readily understandable and simplified block representations and schematic diagrams, in order not to obscure the disclosure with structural details which will be readily apparent to those skilled in the art having the benefit of the description herein.

FIG. 1 is an illustrative block diagram of a first computer network 100 implemented in accordance with one embodiment. The first computer network 100 can be any type of computer network or other type of network where a plurality of nodes can communicate with a single controlling entity, including but not limited to any type of computer network as defined above. The first computer network 100, in certain embodiments, can be a network contained within a single apparatus (e.g., a car), within a building (e.g., a network of security cameras and locks), can comprise devices spread out all over a geographic area (e.g., a network of sensors tracking movement of vehicles/traffic), can contain devices disposed all over the world and beyond (e.g., space satellites communicating with a central authority which itself may be disposed within a spacecraft), etc.

In the example embodiment of FIG. 1, the first computer network 100 includes a network authority 102 in operable communications with a plurality of nodes 110 and with one or more network resources 124. In certain embodiments, the network authority 102 controls the access of the nodes 110 (including communications, such as inputs/outputs (I/O)), to the network resources 124, via secure, encrypted communications. In certain embodiments, the network authority 102 also controls communications between network nodes 110, to ensure that these communications are secure, properly encrypted, and resistant to attack. In certain embodiments, in accordance with the features, methods and aspects described further below, is able to ensure that only authenticated nodes are able to connect to the first computer network 100, e.g., to access the network resources 124 and/or to communicate with other network nodes 110.

The network authority 102 is, as defined previously, a trusted secure host that manages and/or controls access to the first computer network 100. The network authority 102, in certain embodiments, has access to a plurality of respective sets of stored PUF characteristic data 104 (e.g., 104a-104d), where each respective set of stored characteristic data 104 of the PUF comprises information associated with a respective PUF of a node 110, such as the nodes 110 in with a nodes group 106 comprising a plurality of respective nodes 110a-110d, which can include both wired clients (e.g., nodes 110a, 110b) that communicate via a wired network device 114 and wireless clients (e.g., nodes 110c, 110d) that communicate via a wireless access 108 (e.g., a wireless communications system). Each respective set of characteristic data 104 of the PUF is unique from every other set of respective characteristic data 104 of the PUF, because each PUF 112 is unique (hence its illustration using fingerprint icons in FIG. 1). In certain embodiments, the set of characteristic data 104 of the PUF is made accessible to or provided the first network authority 102a independently of the any requests to access the first network 200a. For example, as described further herein, the characteristic data 104 about the PUF can be provided in advance, as part of an enrollment process (see FIG. 3) and then stored in a location (e.g., the database of enrolled nodes 118a of FIG. 2, discussed further herein) that is accessible to the network authority 102. Although only four nodes 110 are depicted in the example first computer network 100 of FIG. 1, it will be appreciated that the first computer network 100 can have fewer than four nodes (even just one node) and/or many more than four nodes, and that the number of nodes 110 in the first computer network 100 can be changing constantly. For example, in some embodiments, nodes 110 may connect to the computer network only periodically or intermittently, and in some embodiments, nodes may connect to the first computer network 100 and stay connected so long as they are authorized to do so (authorization is described more fully below).

The network authority 102, although depicted in FIG. 1 as a single system, can of course be implemented, in embodiments herein, using one or more computing systems that together operate as a single first network authority 102 that is configured to control access to the first computer network 100. For example, in certain embodiments, the first computer network 100 is implemented as a centralized network, and the network authority 102 represents a singular authority or administrator or host that is configured to retains total control over all aspects of the network, such as via a central server that manages all data, permissions, authentication, etc., for clients connected to the first computer network 100. In other embodiments (e.g., as discussed below in connection with FIG. 2), a given node 110 can be configured to be coupled to more than just the first computer network 100 (e.g., coupled to more than one network).

Each respective node 110 corresponds to any type of a device that is able to communicate over a network, such as the first computer network 100, in a wired and/or wireless manner, or via any other type of communication methodology. In at least some embodiments, a node 110 can include any and all devices described above in the definition of "Internet of Things." Although FIG. 1 depicts several nodes 110 as being computer systems, the embodiments described herein are not so limited. In at least some embodiments, the network authority 102 may itself be a computer system and a given node 110 may be a component within that same computer system.

Each respective node 110a-110d has associated with it at least one or more respective unique PUF(s) 112a-112d. In certain embodiments, the respective PUF(s) 112 is a challengeable PUF as defined above, where the PUF is implemented to be embedded within or as part of the respective node 110. For example, if a given node 110 is a computer system, the PUF 112 could be implemented within any device (e.g. a memory chip, field programmable gate array (FPGA), and/or another integrated circuit) contained within the computer system, but this is not limiting. Advantageously, in certain embodiments, the PUF 112 is configured to be a strong PUF, as defined above. In some embodiments (see FIG. 2), a node 110 may have more than one PUF 112, and the additional PUFs can be used for authentication in various combinations. For example, in some embodiments, a given node 110 may use one PUF 112 for authentication to multiple computer networks in addition to the first computer network 100. In some embodiments, a given node 110 may use a unique PUF 112 for each respective type of network it needs to access. In some embodiments, a given computer network 100 and node 110 may be configured so that the first computer network 100 sends challenges to more than one PUF 112 on a device and requires that all challenges be satisfied before access is granted. In addition, key management (discussed further below) can be tailored based on the number of PUFs 112. For example, each PUF 112 within the same node 110 may be used (in combination with a received challenge) to create a unique key, wherein a node 110 may be configured to communicate using either key, so long as the network authority 102 has or can compute copies of both keys and can recognize that the node is authentic and using one of its correct keys. In certain embodiments, a given PUF 112 within a given node 110 can cooperate with more than one network authority 102 to generate multiple keys, e.g., to establish communications between a node 110 and more than one other entity, if desired.

In addition, the nodes 110 do not all have to have the PUF 112 located within the same component as other nodes 110. For example, consider first computer network 100 in accordance with the embodiments herein, that comprises a first and second nodes 110f, 110g The first node 110f in the example first computer network 100 corresponds to an internet-enabled fire sensor device, wherein a PUF 112f for this first node arises from a delay time that arises when a certain signal is applied to or certain data is sent to, a component of the fire sensor. The second node 110g in the example first computer network 100 is a mobile phone having an SRAM (static random access memory) PUF, where the SRAM PUF arises based on random bits in the SRAM that exist when the mobile phone boots up after being turned on. Those of skill in the art will appreciate that this is but one examples and that many different types of PUF are usable in various embodiments herein.

Figure 4:
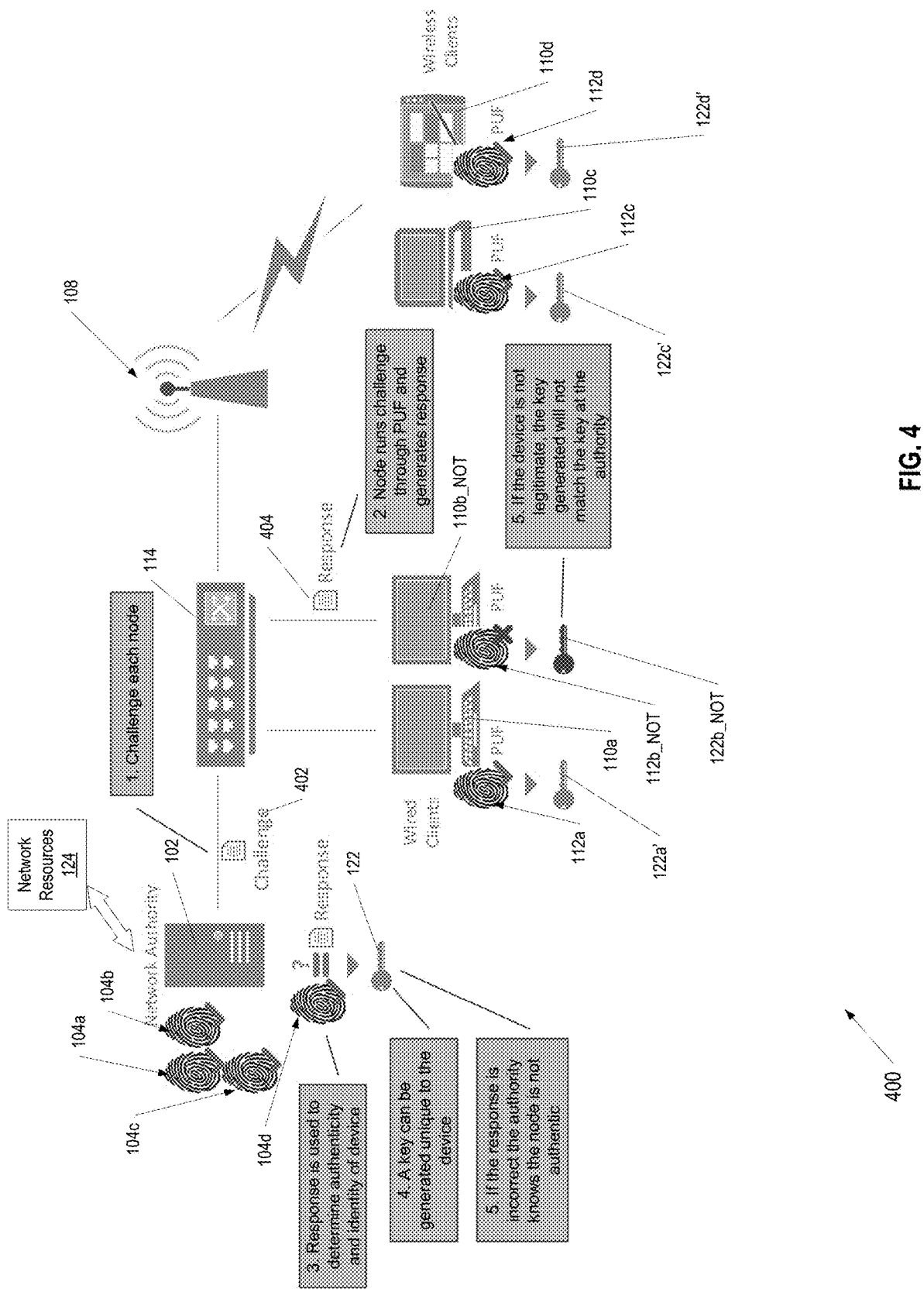
FIG. 4 is in an illustrative block diagram showing the first computer network of FIG. 1 during the enrollment of FIG. 3 and the authentication of FIGS. 5 and 6, in accordance with one embodiment.
Figure 5:
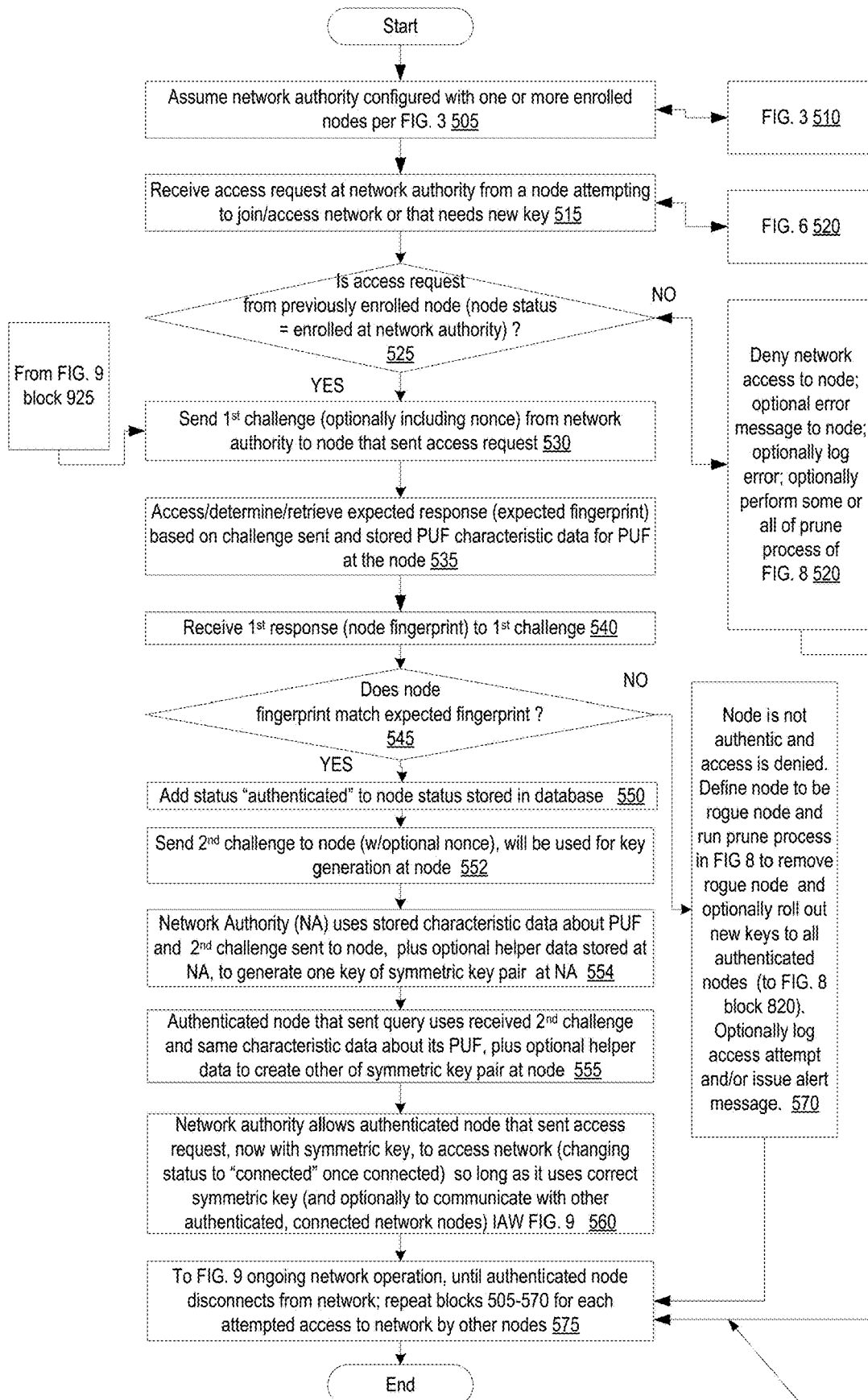
FIG. 5 is a flowchart of a process for authenticating a network node to a computer network, from the perspective of a network authority, in accordance with one embodiment.
Figure 6:
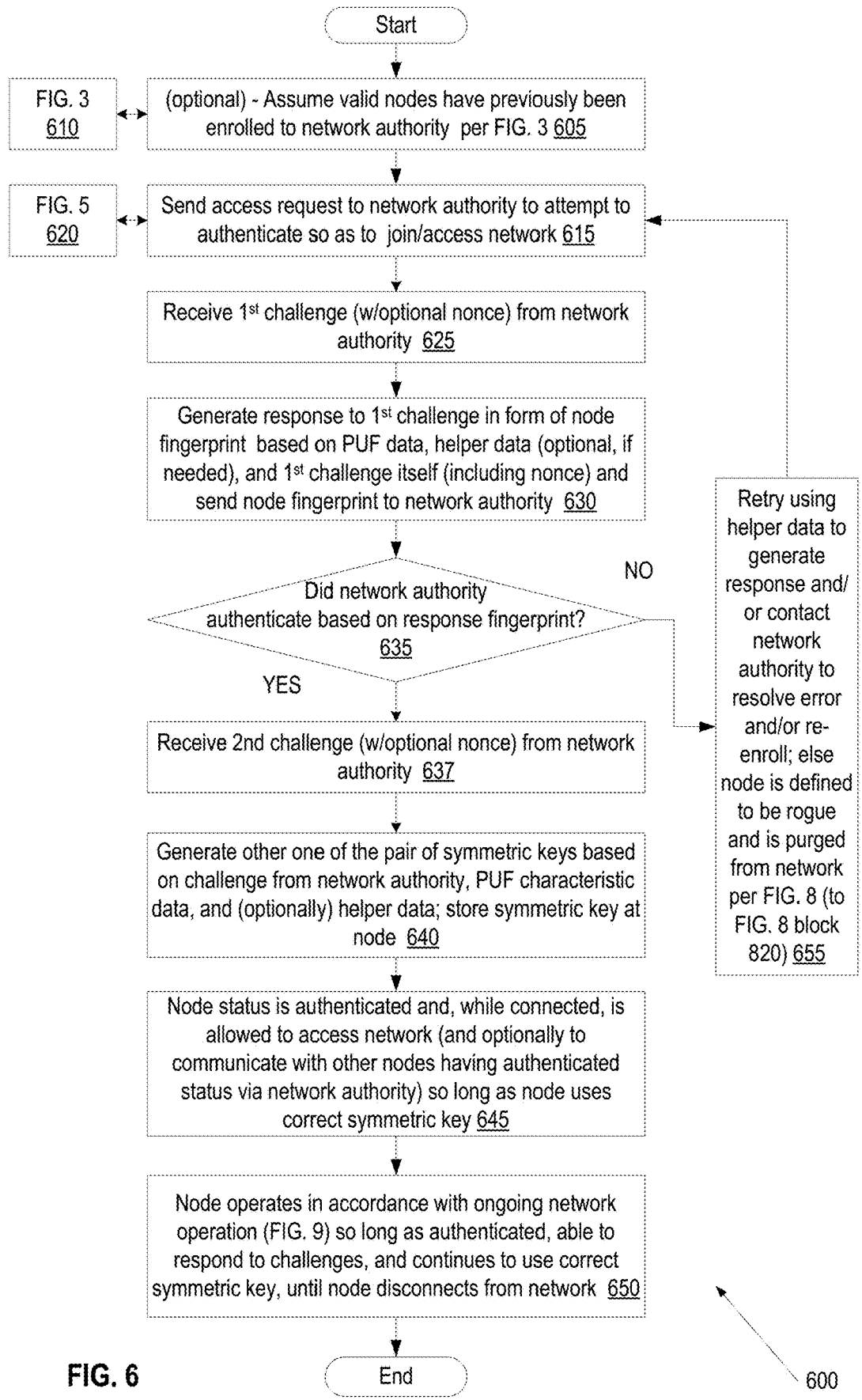
FIG. 6 is a flowchart of a process for authenticating a network node to a computer network, from the perspective of a network node, in accordance with one embodiment.

In certain embodiments, the PUF 112 is capable of creating a key (e.g., a symmetric key) using a challenge received from a remote entity, such as the network authority 102, where the key is based on the challenge and on the response of the PUF 112 to the challenge (this is discussed further herein in connection with FIGS. 4-6). For example, in certain embodiments, the network authority 102 uses a series of two challenges. First, the network authority 102 sends a first challenge to a node 110 and receives an actual response from the node 110. The network authority uses the characteristic data 104 and the first challenge it sends, to calculate an expected response which is compared against the actual response received from the node 110. If the expected response matches the actual response, this authenticates the node 110. The network authority 102 then sends a second challenge to the node to cause the generation of the key 122' at the node 110. The network authority generates the same key 122 using again the characteristic data 104 and challenge that it sent (e.g., the second challenge, which can be identical to or different from, the first challenge, as will be appreciated). In certain embodiments, this process avoids sending a key 122 across the network 200 and prevents influencing the generation of keys by attacking the challenges/responses.

In certain embodiments, the entity sending the challenge (such as network authority 102) is capable of creating an expected response (based on the stored characteristic data 104 that it has, and the challenge it sends) which the network authority 102 can compare to a "received" response from a node 110 that contains the PUF 112 being challenged. Comparing the expected response with the received response can help the network authority 102 to determine if a node 110 is authentic, without requiring the network authority 102 to have to perform additional steps or attempt to decrypt any communications from the node 110. In certain embodiments, the network authority 102 and the characteristic data 104 of the PUF 112 are configured (e.g., via the second challenge, as noted above) to result in unique pair of symmetric keys 122 (see FIG. 2, discussed further herein) for every challenge that the network authority 102 sends to the device containing the PUF 112 (this is explained further in connection with FIGS. 4-6 herein). As is understood, the pair of symmetric keys 122, 122', in certain embodiments, is usable to encrypt communications between a node 110 and other entities, such as between the node 110 and the first network authority 102a. Once a node 110 is authenticated, these symmetric keys 122 are used for communications between the respective node 110 and the first computer network 100. As will be appreciated, each unique PUF 112 should result in a unique key 122.

In some embodiments, the PUFs 112 at the node 101 that are used for authentication to the first computer network 100, also can be usable, within the node 110, to create a key 122 that can be configured to protect information stored on the node 110 itself. For example, the PUF 112 used for device authentication, also can serve, effectively as a physical security anchor or "hardware root of trust" for a node 110. Or device. In certain embodiments, the PUF 112 used for authentication can also be used to generate, in certain embodiments, a device-unique and unclonable cryptographic root key that can be used to protect the application keys and certificates of a device, from being copied to a rogue device that is attempting to impersonate a genuine device. Those of skill in the art will appreciate that any known or developed uses for PUFs 112 within a device such as a node 110, are expected to be compatible with the applications of the PUF 112 described herein.

Figure 2:
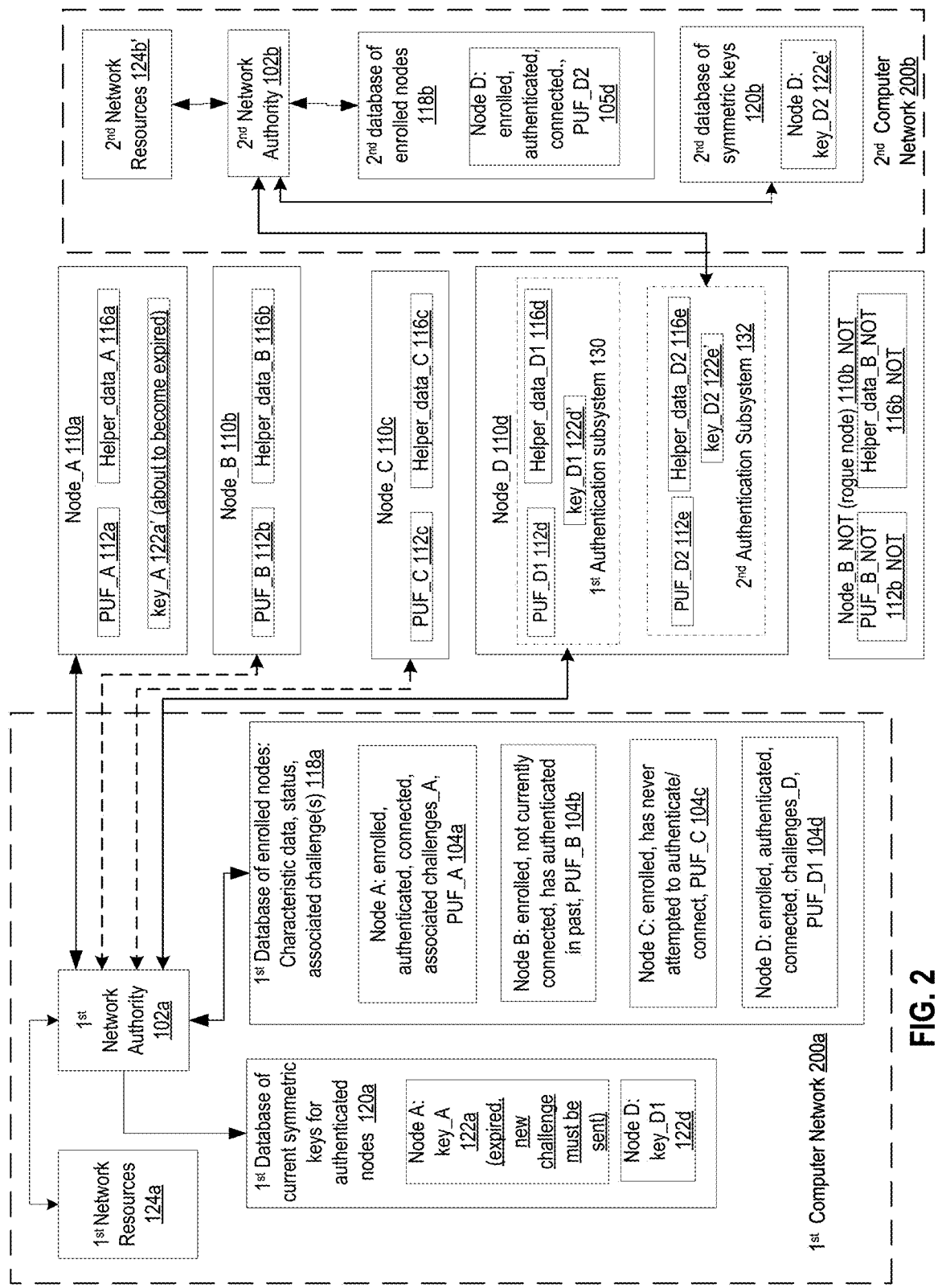
FIG. 2 is a simplified block diagram of second and third computer networks implemented in accordance with one embodiment.

FIG. 2 is a simplified block diagram of first and second and networks 200, 201 implemented in accordance with one embodiment. The first network 200a and second network 200b of FIG. 2 are generally similar to the computer network 100 of FIG. 1. Thus, descriptions for elements in FIG. 1 are applicable to commonly numbered elements in FIG. 2. Both FIGS. 1 and 2 depict four enrolled nodes 110 labeled as Node A through Node D (enrollment of nodes is explained further below). However, the first network 200a and second network 200b of FIG. 2 illustrate further functional aspects of certain elements. FIG. 2 also shows an example embodiment where there is an additional node: node B_NOT, which is a rogue (unauthorized) node that is not an enrolled node 110 (more about network operations that deal with such a node is discussed further herein in FIGS. 5-9 herein. Both FIGS. 1 and 2 depict arrangements, systems, and methods that are usable for controlling access to the first computer network 100 to, first network 200a, and/or to second network 200b, therein, as is explained further herein.

Additionally, in FIG. 2, but for one of the nodes in FIG. 2, namely node D 110d, that node D has two different PUFs 112 (i.e., PUF_D1 112d, PUF_D2, 112c), where PUF_D1 112d is used for authentication to first computer network 200 (and generation of a first key D1 122d' for node 110d) and PUF_D1 112e is used for authentication (and generation of a second key D2 122e' for node 110d) to second computer network 201. In this example embodiment, node 110d is configured to use first key D1 122d' when it accesses first network 200a and to use second key, key_D2 122e', when it accesses second network 200b.

Figure 3:
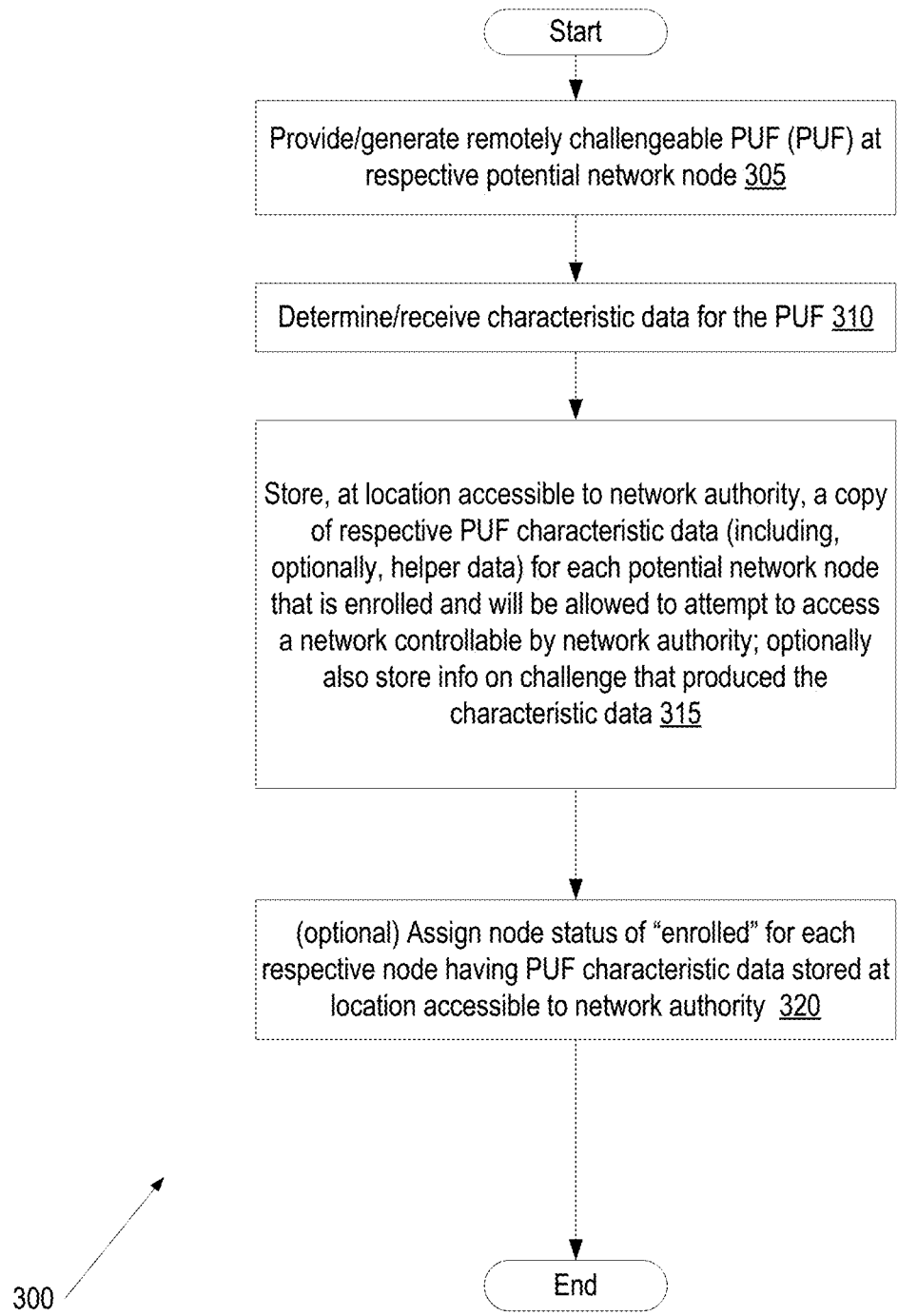
FIG. 3 is a flowchart of a process for enrolling a network node to a computer network, in accordance with one embodiment.

Referring to the first network 200a of FIG. 2, the first network authority 102a of first network 200a is shown as being in operable communication with the first network resources 124a (as noted above) and also with two databases: a database of enrolled nodes 118a (e.g., nodes that have been enrolled to the first network 200a, such as via the process of FIG. 3, discussed further herein) and a database of current symmetric keys 120b. Note that second computer network 200b similarly includes second network resources 124b, a second database of enrolled nodes 118b, and a second database of current symmetric keys 120b, but for clarity, most operations will be discussed herein for the first network 200a.

In certain embodiments, the first database of enrolled nodes 118a includes, for each enrolled node 110: information relating to characteristic data 104 for the node 110 (e.g., information about characteristics of the node's PUF 112 including how it should be challenged, what an expected response should be, information relating to the helper data 116 for the node's PUF 112, etc.), whether the node 110 has ever been authenticated, whether the node 110 is currently connected to the first network authority 102a, and, if the node 110 is currently connected, information on the challenges that were sent to the node 110. In some embodiments, the enrollment of a node 110 to the first database of enrolled nodes 118a is done in advance of the node 110 attempting to authenticate itself to the network 200. In some embodiments, the enrollment of a node 110 can be done at the time a given PUF 112 is manufactured or installed into the nodes 110.

The first database of current symmetric keys 120*a* includes, for each enrolled node that has authenticated itself to the first network authority 102*a* and that is currently connected, one half of a pair of symmetric keys 122 that the first network authority 102*a* uses for communications between the node 110 and the first network authority 102*a*, wherein, if desired, the node 110 can have input/output (I/O) with first network resources 124*a*. In certain embodiments, the symmetric keys 122 are created during and/or in connection with the authentication process (described further below in connection with FIG. 5) and can be updated when certain predetermined conditions occur, such as if the keys 122 expire during the time the node 110 is connected, if there an attempted network intrusion by a rogue and/or unenrolled node (e.g., rogue node 110*b*_NOT), if a given node 110 is authenticated but using the wrong key 122 (e.g., a key 122' at node 110 somehow got corrupted), if the first network authority 102*a* has periodically scheduled key updating, or any other desired condition. In certain embodiments, if a node 110 disconnects from the first network 200*a* temporarily, as is shown in FIG. 2 with node B 110*b* being s disconnected in FIG. 2, via the dotted line connection, the node 110 and first network authority 102*a* must generate a new pair of symmetric keys 122, 122' the next time the node 110 connects again. This helps to improve key security. The first database of current symmetric keys 120*a* stores the symmetric key 122 currently in use with a given connected and authenticated node 110. During connection to the first network authority 102*a*, a currently connected node 110 (e.g., as shown in FIG. 2, Node_A_110*a* and Node_D_110*d*) can store its respective copy 122*b*' of the symmetric key.

However, in certain embodiments, once the node 110 disconnects from the first network 200*a*, the key 122' at the node 110 is not retained. This is shown, for example with Node_B_110*b*, which has been authenticated and enrolled in the past (as shown via the first database of enrolled nodes 118*a*), but which is not currently connected, so does not have a current symmetric key 122' in place. Thus, in certain embodiments, a given pair of stored symmetric keys 122 is not re-used the next time a given node 110 connects, to help prevent re-use of keys by bad actors to gain access. Rather, in certain implementations, new symmetric keys 122, 122' are required with each connection and/or authentication.

Figure 9:
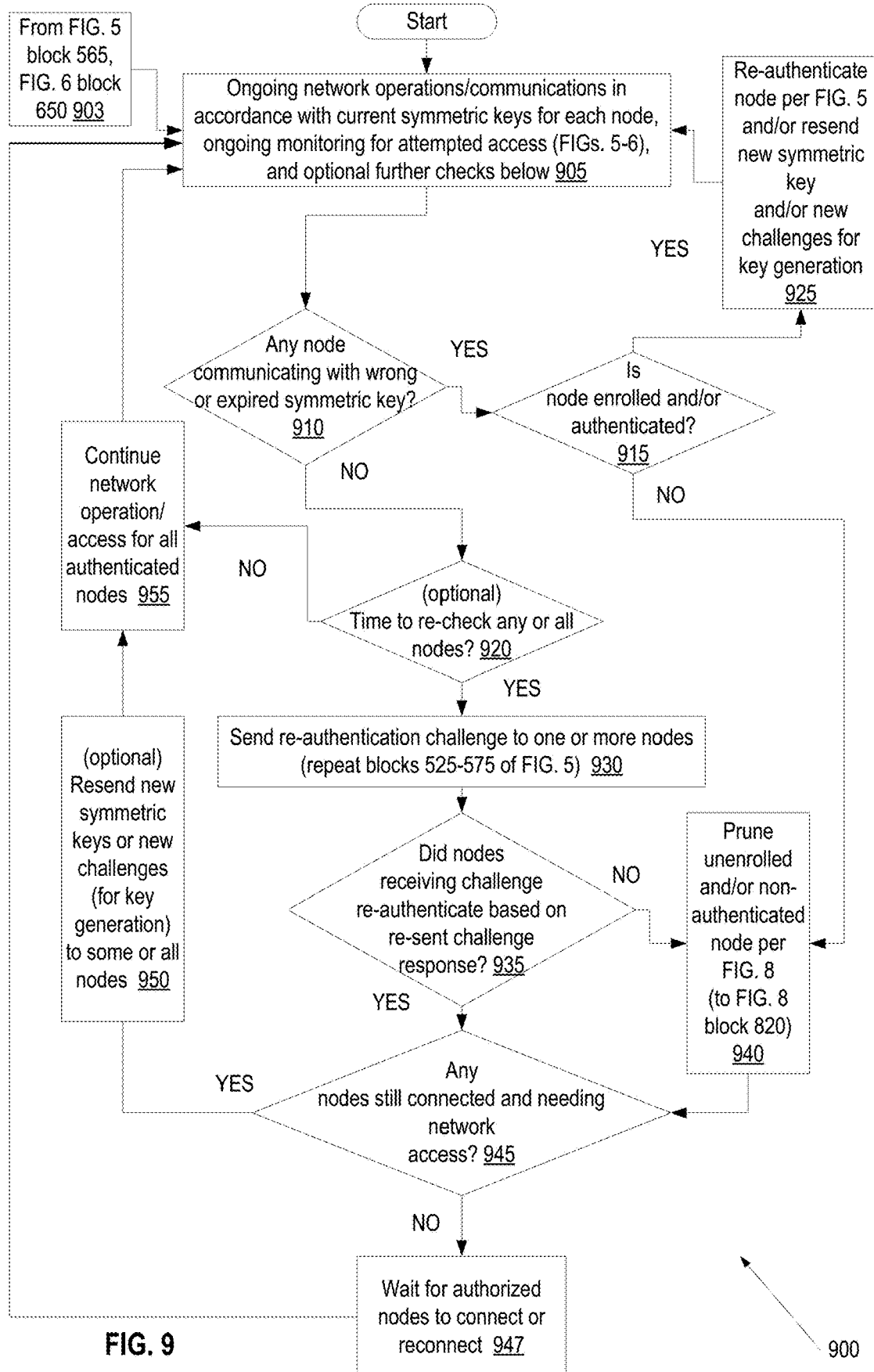
FIG. 9 is flowchart of a method for detecting and monitoring a computer network, during ongoing operation, to detect potential rogue nodes and rogue node operation, in accordance with one embodiment.

In addition, as FIG. 2 shows, in certain embodiments, a connected node (in this example, Node_A110*a*) may have its key expire during the period it is connected, as indicated in FIG. 2 by the notation in the first database of current symmetric keys 120*a*, that for Node A 110*a*, the Key_A122*a* is expired and the first network authority 102*a* must send a new challenge to Node A110*a* to enable the generation of a new symmetric key pair 122, 122', a process which is further described as part of ongoing network operation in FIG. 9 herein.

FIG. 2 also demonstrates, for an exemplary embodiment, nodes 110 in various states of connection, authentication, etc., to the first network 200*a* and second networks 200*b*, showing which nodes 110 are currently connected and which are not. For example, as shown in FIG. 2, some nodes 110 are currently connected to the first network 200*a* (Node A 110*a* and Node D 110*d*-note that Node D 110*d* also is connected to the second computer network 200*b* at the same time), as shown by the solid connection line between the respective node 110 and the network authority 102. Some nodes 110 are shown as previously enrolled, but not currently connected to network 200*a* (Node B 110*b* and Node C 110*c*), as shown by a dotted connection line between the respective node 110 and the network authority 102. In addition, for the two currently unconnected nodes Node B 110*b* and Node C 110*c*, FIG. 2 shows that Node B 110*b* had authenticated in the past to the first network 200*a*, but, since Node B 110*b* is not now currently connected, no symmetric keys 122, 122' are stored at either the first network authority 102*a* or Node_B 110*b*.

Figure 8:
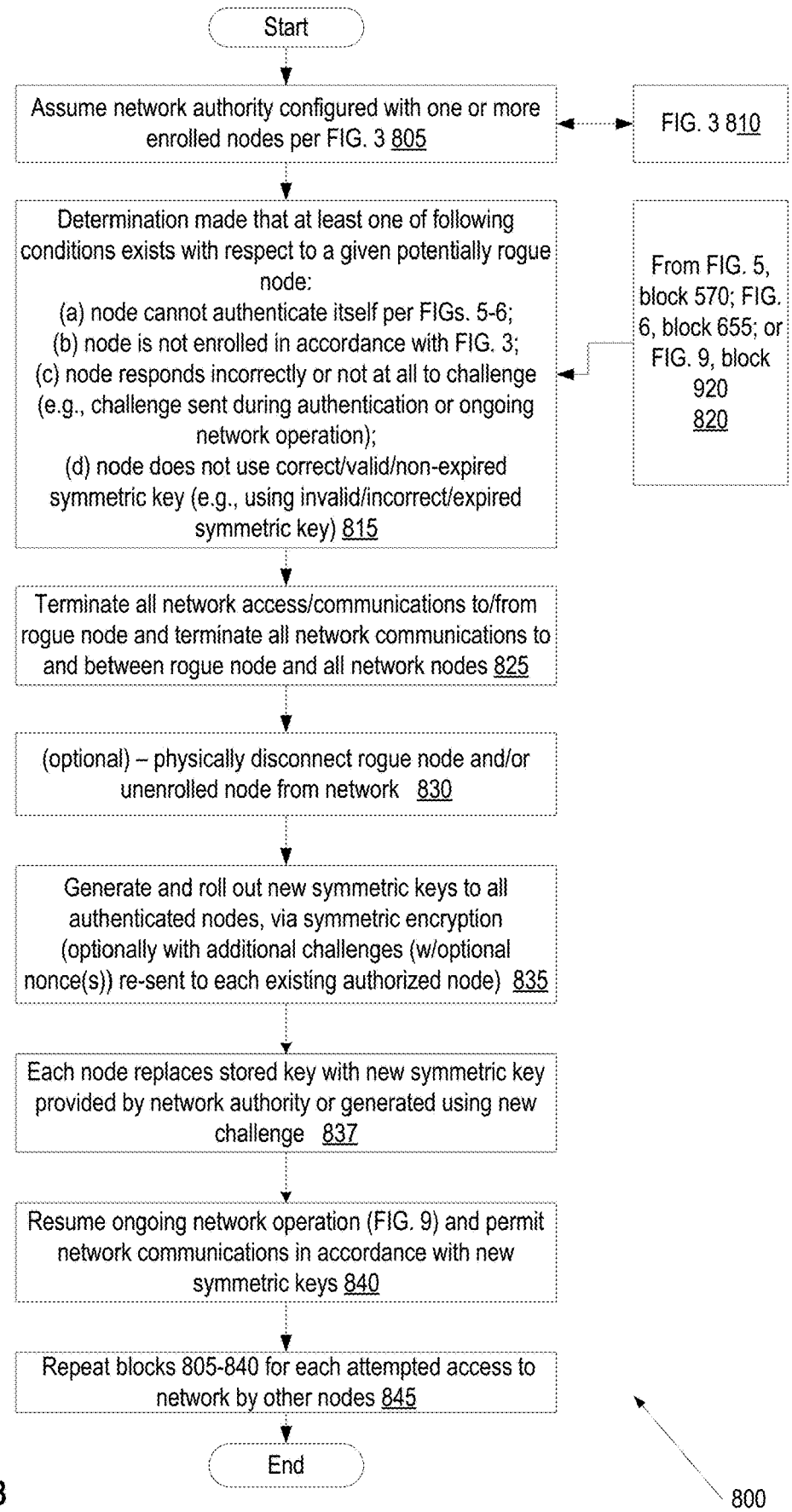
FIG. 8 is a flowchart of a method for pruning a rogue node from a computer network, in accordance with one embodiment.

As shown with Node_A_110*a*, A key 122 may change from being currently used to "expired," even while a node 110 is using it, depending on whether any specific predetermined conditions arise (described further herein in connection with FIGS. 8-9). FIG. 2 depicts this situation for Node A 110*a* in the condition where Node A_110*a* still thinks it has a current symmetric key 122', but where the first network authority 102*a* has just determined that the symmetric key 122*a* that it has for Node_A_110*a*, has expired, just before first network authority 102*a* re-sends a new challenge to Node_A_110*a*.

For Node_B_110*b*, a new symmetric key 122 will be generated the next time Node B 110*b* authenticates to the network. In certain embodiments, once a given node 110 disconnects from the first network 200*a*, its currently used symmetric key 122' for that connection, is no longer saved, to help prevent any compromise in attacking stored keys. In those embodiments, a node 110 will require a new key 122' for every connection to the first network 200*a*.

As will be appreciated, in certain embodiments, depending on the node 110 and the application/implementation, a given node 110 itself may or may not be aware that its key 122' has expired even while the node 110 is still connected to the first network 200*a*. For example, in other embodiments, a given node 110 might not know that its respective symmetric key 122 has expired until it attempts to communicate over a network 200 to which it has been connected, but where it has been idle or has not communicated in some predetermined period of time. FIG. 2 shows that this is about to happen with Node_A_110*a*. As those of skill in the art will appreciate, key management is an implementation detail that can be tailored to a given application. Advantageously, in certain embodiments, keys 122 are not stored except during a given authenticated connection session, because storing keys 122 can present a further problem of needing to protect the location where the keys are stored. In certain embodiments, keys 122 are generated (at both the first network authority 102*a* and the respective node) as needed, and there is no need to store historical information on keys 122.

In one embodiment, the first database of enrolled nodes 118*a* also can include information on a status of a node 110, such as whether the node 110 is currently connected and whether the node has been authenticated to the first network authority. Optionally (not shown) the status also could include expiration information on when and if any symmetric keys 122 for any connected nodes 110 will no longer be valid (e.g., a date and time of a future expiration of the pair of symmetric keys 122, 122', which applies even if the node 110 is still connected at that time). For example, it is possible, in certain embodiments, that a condition may arise wherein one or more currently connected nodes 110 may need to generate new keys, even while the node 110 is still connected. One example condition where this may arise is where a given node 110 has been connected so long to the first network authority 102*a* that an expiration period for the symmetric key pair 122 has expired (e.g., as with Node_A_110*a*). Even though the given node 110 is still connected, the first network authority 102*a* sends an additional challenge to the given node 110, not necessarily to re-authenticate the given node 110, but instead to prompt the given node 110 (and the first network authority 102a) to generate new symmetric keys 122 (at first network authority 102a) 122' (at the given node 110). Another condition where this may be required, in certain embodiments, is if a rogue node 110b_NOT or other bad actor, has attempted to access the first network 200a, wherein the first network authority 102a may re-establish, roll out or otherwise require or create new symmetric keys 122 from all connected nodes 110 to replace whatever symmetric keys 122 that the nodes 110 are currently using (this is discussed further herein in connection with FIG. 7 and the flowchart of FIG. 8).

Referring again to FIG. 2, FIG. 2 also shows that, for Node_C 110c, although the first database of previously enrolled nodes 118a shows that Node C 110c is enrolled to the first network 200a, the first network 200a does not yet have any record of Node C 110c attempting to connect to or authenticate itself to the first network 200a. Thus, since Node C 110c is not currently connected, the first database of current symmetric keys 120a, does not yet have a symmetric key 122 that is associated with Node C 110c, and Node C 110c also does not have a current symmetric key 122. This further helps to keep the first network 200a secure, to help prevent a given node 110 from being "swapped in" after a legitimate node 110 authenticates—the replacement unauthorized node still would not have the correct symmetric key 122 to communicate on the network, and this would be detected in the operations of the network during normal network operation (as discussed further in connection with FIG. 5-9 below. Further, as is explained herein in connection with FIG. 5, both the authentication and the key generation, at the first network authority 102a, depend on the response of the PUF 112 at the node 110, to first and second challenges that the first network authority 102a sends to the node. This dependency between the first network authority 102a and the node 110 and the node's PUF 112 helps to prevent reverse engineering of the PUF responses from simply looking at the helper data 116 that is stored, in certain embodiments, as part of the characteristic data 104 that is stored in the first database of enrolled nodes 118, in the first network authority 102a.

FIG. 2 also shows that not only is the rogue node (Node B_NOT) 110b_NOT, not connected to the network 200, there is no listing of this node in either the first database of enrolled nodes 118a or the second database of enrolled nodes 118b, nor are there any symmetric keys 122 stored for this rogue node 110b_NOT in either the first database of current symmetric keys 120a or the second database of current symmetric keys 12b. In accordance with at least some embodiments herein, a rogue node 110b_NOT will never be able to authenticate itself to the first network authority 102a because they cannot possess the expected, enrolled PUF 112 or know or simulate its unique response to a given challenge. Thus, the rogue node 110b_NOT cannot ever generate the correct symmetric key, because generation of the correct symmetric key, in certain embodiments, requires possession of both the PUF itself (or its characteristic information) and the challenge sent to the PUF 112. 102a and This is addressed in FIGS. 4-9 further below.

Referring again to FIG. 2, in certain embodiments, one or more of the nodes 110 also can include respective helper data 116 (this helper data 116, in certain embodiments, is part of the characteristic data 104 that the first network authority 102a receives about the node 110 at enrollment, as discussed in connection with FIG. 3). The helper data 116 for each PUF 112 is data similar to that defined above as "helper data," and is used, in certain embodiments, to help stabilize and compensate the respective PUF 112, e.g., for alterations in its output due to environmental effects and conditions (e.g., temperature, interference, noise, vibration, etc.). In certain embodiments, the helper data 116 is configured to ensure that it contains no information or other means to reverse engineer any information that the PUF 112 provides, including information about the respective key 122 associated with the respective node 110. In certain embodiments, helper data 116 is used, along with the PUF's 112 response to a second challenge (after the authentication challenge), to help generate the appropriate respective key 122 for the respective node 110. In certain embodiments, helper data 116 that the PUF 112 uses contains no information or means to reverse engineer the keys that the PUF 112 generates. Helper data 116 may not be required or used in all embodiments, as will be appreciated.

As noted above, a given node 110 could be configured for communication with and enrollment to, more than one type of network 200, even at the same time. For example, as shown in FIG. 2, Node D 110d is configured with first authentication subsystem 130 and second authentication subsystems 132, which are usable to help connect Node D 110d to either or both of first network 200a and second network 200b. The first authentication subsystem 130 is configured for authentication to the first network 200a, and the second authentication subsystem 132 is configured for authentication to the second network 100b. The first authentication subsystem 130 for Node D 110d includes a respective PUF_D1 112d which will be challenged by first network 200a when Node D 110d attempts to access the first network 200. The second authentication subsystem 32 includes a respective PUF_D2 112e, which will be challenged by second network 200b if Node D 110d attempts to access the second network 200b. Each respective authentication subsystem 130, 132 for Node D 110d also includes its own respective helper data 116 (e.g., helper_data_D1 112d and helper_data_D2 112e) and is configured to generate its own respective key 122 (e.g., key_D1 122d' and key_D2 122e'), after receiving and responding to a respective challenge from the respective first network 200a or second network 200b, as shown in FIG. 2. The example embodiment of FIG. 2 illustrates that Node D 110d is connected to both the first network 200a and the second network 200b at the same time, with a different respective PUF (PUF_D1 112d, PUF_D2 112e, respectively) and key (key_D1 122d', key_D2 122e') for each respective network 200a, 200b, respectively.

FIG. 3 is a flowchart of an enrollment process 300 for enrolling a network node 110 to a computer network 100/200a/200b, in accordance with one embodiment. For simplicity, operations of this enrollment process 300 are discussed in connection with first network 200a of FIG. 2, but the enrollment process 300 is equally applicable to first computer network 100 of FIG. 1 and second network 200b of FIG. 2. The enrollment process 300 is shown from the perspective of the first network authority 102a.

Referring to FIGS. 1-3, in certain embodiments, a potential network node 110 is provided with a remotely challengeable PUF 112. By "potential network node" it is intended to refer to a node 110 that is not yet enrolled to the first network authority 102a. By "provided," it is at least intended that the potential network node 110 has a PUF 112 either installed or configured as part of the node 110 or configured so as to be readily accessible to the node 110. Note that, in certain embodiments, the most secure configuration would be one where each node 110 has the PUF directly installed to or within or as part of, the node 110. Having the PUF 112 instead be accessible to the node 110

(e.g., installed in another device that the node 110 is operably connected to, such as installed in an uninterruptible power supply or other power source for a node 110) may be possible in certain embodiments, but may be less secure. By "remotely challengeable PUF," it is intended to refer at least to the remotely challengeable PUF as defined previously, wherein the PUF 112 is configured to create a unique response to a challenge that it receives and to create a respective key 122 based at least in part on the received challenge received and on the response of the PUF 112 to that challenge (which response can include or comprise the characteristic data 104 for the PUF), where the PUF 112, in certain embodiments, advantageously is also a strong PUF, meaning that it has an exponentially large challenge/response space.

Characteristic data 104 for the PUF 112 is determined, received, provided and/or otherwise obtained in block 310. In certain embodiments, this characteristic data 104 includes information about the helper data 116 for the PUF 112. There are a number of ways to obtain this data, as will be appreciated. For example, at the time a device (or set of devices) embodying or including the PUF 112 is manufactured, the manufacturer can subject the PUF 112 to one or more types of challenges and then record the response to the challenges as exemplary characteristics of that PUF 112. The manufacturer can provide this information as characteristic data 104 to one or both of the manufacturer of the node 110 and/or first network authority 102a at the time the PUF 112 is installed into or is made accessible to the node 110. For example, in some embodiments, the manufacturer of the node 110 may not be given directly the characteristic data 104 for the PUF being installed, and that characteristic data 104 may be provided to the first network 200a as part of the advance enrolling of the node 110 (or advance enrolling of the PUF 112 itself) to the first network 200a. In other embodiments, the characteristic data 104 for a PUF 112 may be provided along with the component that embodies the PUF 112, to any manufacturer that is to install that PUF into other devices.

For example, if the PUF 112 is embodied in a memory chip, the paperwork that accompanies the chip when it is shipped might include information relating to the characteristic data 104 of the PUF 112 that is part of that chip. An illustrative example of the characteristic data 104 for a given PUF that is a processing chip could be, for example, information that if a certain sequence of signals is applied to pin 5, the output appearing at pin 20 will appear. In another example, a manufacturer might provide a component with instructions on how to set it up so as to provide a PUF feature when the component is installed to a next higher assembly. For example, a first manufacturer may indicate delay times across certain paths of a device, and a second manufacturer, who installs the device into a circuit board that is part of a node 11, may use that information, along with its own measurements, to designate one or more possible PUFs 112 that can be usable for the node 110. Those of skill in the art will appreciate that there are many possibilities for providing and storing characteristic data 104 of the PUF.

Referring again to FIG. 3, once the particular characteristic data 104 for the PUF 112 is obtained determined and/or received (block 310), the characteristic data 104 (including, in certain embodiments, helper data) can be stored (block 315) at a location accessible to the first network authority 102a, such as the first database of enrolled nodes 118a. This is done for each node 110 to be enrolled to the first network authority 102a. Optionally, in certain embodiments, information relating to the challenge that produced the characteristic data 104, also can be stored along with the characteristic data 104, e.g., in the first database of enrolled nodes 118a, as noted previously. Once stored, it can be known that if a challenge is performed that repeats conditions present when the characteristic data 104 was created, if the response to that challenge matches (to whatever degree defined by a given application, e.g., within a Hamming distance as noted previously) the characteristic data 104 that was stored about the PUF 112, then there is reasonable certainty that the PUF 112 that created the response is the same PUF 112 that was used to generate the characteristic data 104, because the combination of the challenge and the PUF 112 are intended to be unique enough to authenticate the node 110. This helps to ensure authenticity of the node 110 containing or having access to the PUF 112. Enrolling a node 110 means that the node 110, once it attempts to access a network 200 and/or network resources 124, will be able to receive a challenge (discussed further herein) configured to challenge a corresponding PUF 112 at the node 110, to establish authenticity of the nodes 110.

In block 320, optionally, the status of each node 110 is tracked. For example, in some embodiments, as noted above in connection with FIG. 2, the first network authority 102a maintains a first database of enrolled nodes 118a which is configured to track enrolled nodes 110, including corresponding characteristic information for one or more PUFs 112 associated with each respective enrolled node 110, as discussed above. The first network authority 102a can assign a status of "enrolled" for each node 110 that has its PUF 112 characteristic data 104 stored at a location accessible to the first network authority 102a, such as the first database of enrolled nodes 118a. Note that, although the example first database of enrolled nodes 118a shows characteristics for only one PUF 112 per node 110, that is not limiting, as explained above in connection with FIG. 2. Depending on desired application, a given arrangement for the first network 200a could include one or more nodes 110 having more than one PUF 112 per node, and one or more sets of respective node characteristics being stored in the first database of enrolled nodes 118a, as noted above in connection with FIG. 2.

FIG. 4 is in an illustrative block diagram 400 showing the first computer network 100 of FIG. 1 during the enrollment of FIG. 3 and the authentication of FIGS. 5 and 6, in accordance with one embodiment. FIG. 4 illustrates, for one embodiment, the components of the first computer network 100 that cooperate to perform the actions of FIGS. 5 and 6, at a high level. These components operate similarly to the similarly numbered components in FIGS. 1 and 2. Referring to FIG. 4, the network authority 102 is assumed to be a secure trusted resource that has access to respective characteristic data 104 (e.g., characteristic data 104a-104d pertaining to each of four respective nodes 110a-110d). At a start of an authentication process, the network authority 102 issues a first challenge message 402 to each node 110a-110d of the network, the challenge message containing a challenge. For the wired nodes 110a, 110b, the challenge message 402 is communicated via network device 114. For the wireless nodes 110c, 110d, the challenge message 402 is transmitted wirelessly via wireless access 108 (which is shown for illustrative purposes only as a transmitter). In certain embodiments, the first challenge does not contain any data that can be used, by itself, to extract the key 122 or any parameters that, by themselves, can be used to generate the key 122. In certain embodiments, the first challenge contained in the challenge message 402, is configured to result in the generation of a unique response (e.g., a fingerprint) from the PUF 112 even if the challenge is kept the same (e.g., the same challenge is sent to all nodes 110). In certain embodiments, the same challenge, even when sent to multiple different nodes 110, produces unique response from each respective node 110, because each respective node 110 has a PUF 112 that produces a respective unique response.

In certain embodiments, each challenge (including both the first challenge described herein and the second challenge described below) includes a nonce (an arbitrary number, e.g., random or pseudo random) that can be used just once) that is configured to help prevent replay and helps to cause a PUF 112 to generate a unique response each time. Thus, with the nonce, even if an attacker attempts to monitor the response a node 110 is sending to a given challenge, the attacker would not be able to copy or replicate the correct response the node 110 (via its respective PUF 112) sends back to the first network authority 102a, because the response of the node 110 must take into account the nonce, as well, and not just the PUF response.

Each node 110 receives the first challenge message 402 and runs the first challenge contained therein and generates a respective first response message 404 containing that respective node's 110 response to the first challenge. Note that the response (fingerprint) from a node 110 will not be the node's 110 characteristic data 104 for its respective PUF 112 but will, in certain embodiments, be derived from that characteristic data 104 of its PUF 112, such as being derived from the response of the respective PUF 112 to the first challenge. Someone who possesses or intercepts both the challenge and the response, will still not be able to later generate a key 122, because (as described further below), the key 122 is generated using not only a challenge (in fact, a second, subsequent challenge sent after authentication) but also using characteristic data 104 based on or associated with the PUF 112, which characteristic data 104 is never exchanged by itself. Thus, as explained herein, the key 122, in certain embodiments, is created, by each of the network authority 102 and the node 110, separately, using, at least in part, data that is never exchanged by itself between the network authority 102 and the node 110.

After authentication, in certain embodiments, a second challenge, containing a nonce, is sent to the node 110, and this second challenge is used by both the network authority 102 and the node 110, to generate a key 122. In some embodiments, the same second challenge message (but with a unique nonce) can be sent to each node 110, as noted above, wherein the unique nonce for each challenge message helps to prevent a replay attack. In some embodiments, each node 110 gets a second challenge message containing a tailored challenge (and a nonce). Advantageously, as noted above, in at least some embodiments, the challenge message 402 (be it the first challenge or second challenge) and the first response message 404, do not contain any data that can be used, by itself, to extract a key 122 or to be used to generate a key 122. This is because, in certain embodiments, the information necessary to generate the key 122 requires not only the second challenge but also the unique response to that challenge from the PUF 112 that is based on the characteristic data for the PUF 112 (or, at the network authority 102 end, the challenge and the stored characteristic data 104). The nonce, contained in a challenge message 402 is configured to generate a unique response from a given node 110 even when the challenge is kept the same, so that a replay attack is not possible.

In response to the first challenge message 402, the response message 404 contains a response that is used to confirm the authenticity and identity of the respective node 110, because the response is based on the respective unique PUF 112 at the respective node 110. As part of the confirmation, if the response in the response message 404 matches the stored characteristic information 104 (e.g., does the "fingerprint" the node 110 provides match a stored fingerprint that the network authority 102 has), then the response is "correct," and the network authority 102 knows that the node 110 is authentic. The network authority 102 thus can send a second challenge to the node 110 (e.g., via challenge message 402), which both the node 110 and the network authority 102 can use to generate respective, identical, symmetric keys 122, wherein, while the node 110 is connected, the network authority 102 stores a copy of the symmetric key 122 it generates and the node 110 also stores a copy of its respective symmetric key 122', and both symmetric keys 122 are identical keys. If the response to the first challenge message 402 is incorrect, then the network authority 102 knows that the node 110 is not authentic/legitimate. If the node 110 is not legitimate, it cannot generate a symmetric key 122 that matches the key generated at the network authority 102 for several reasons. First, the non-legitimate (rogue) node 110 does not have all the information needed to generate the correct key, because it does not have the PUF 112 that was able to generate the correct response (fingerprint) to match what was stored at the network authority 102. Second, because it is not authenticated, the non-legitimate, rogue node 110 will never receive a second challenge message that is also used (in combination with PUF 112 characteristic data 104 that is stored at the network authority 102 or created at the actual PUF 112 itself) that is used to create the symmetric key 122. Thus, a rogue node 110 can never generate the same key.

FIG. 5 is a flowchart of a process 500 for authenticating a network node 110 to a computer network 100/200 from the perspective of a network authority 102, in accordance with one embodiment. The method of FIG. 5 is applicable to the systems of FIGS. 1-2 and 4 and operates in conjunction with the enrollment method of FIG. 3, and similarly to the authentication method of FIG. 4, in certain embodiments. In certain embodiments, the method of FIG. 5 enables nodes to automatically self-authenticate to a network such as the first network 200a. For simplicity, the method of FIG. 5 is discussed in connection with first network 200a of FIG. 2

Referring to FIGS. 2 and 5, at the start of the process (block 505), it is assumed that the first network authority 102a is configured with one or more enrolled nodes 110 that have previously been enrolled in accordance with FIG. 3 or which are concurrently being enrolled (block 510) with the process of FIG. 3. As part of the enrollment, the first network authority 102a independently receives/obtains information relating to characteristic data for any one or more PUFs 112 (block 310 of FIG. 3) at nodes 110 that will be permitted to seek access to the first network 200a. By "independently receives/obtains," it is at least intended to refer to the first network authority 102a getting the characteristic data 104 relating to the PUF 112, from a source other than the node 110 at the time it is trying to access the first network 200a, to help the first network authority 102a independently access the authenticity of the node 110. An access request is received at the first network authority 102a from a node 110 attempting to join or access the first network 200a (block 515). In some embodiments, the access request comes from a node 110 that needs a new key or a replacement key. The first network authority 102a checks to see whether the access request comes from a legitimate node by checking to see whether the request comes from a previously enrolled node (block 525), such as by checking the first database of enrolled nodes 118*a* to see if the node 110 is enrolled.

If the answer at block 525 is NO (node is not enrolled), then network access to the node is denied (block 520) (i.e., the node 110 that was seeking access, is denied access to the first network 200*a* because it is not enrolled to the network). Optionally, the first network authority 102*a* can return an error message to the node 110 seeking access, can log the attempted access (log not shown in FIG. 2 but readily understood), and/or can send an alert to another entity (not shown) if the other entity needs to be alerted about access attempts. In certain embodiments, the first network authority 102*a* optionally can perform some or all of prune process of FIG. 8 (discussed further herein) to remove the node 110 seeking access from the first network 200*a*, including even in some embodiments physical disconnection.

If the answer at block 525 is "Yes," (node 110 sending access request was previously enrolled), the first network authority 102*a* sends a first challenge message 402, containing a first challenge, to the node 110 that sent the access request (block 530). In some embodiments, this first challenge message 402 includes a nonce. In certain embodiments, the first challenge is configured to elicit a node fingerprint from a given node 110, the node fingerprint based on the first challenge and on unique characteristic data of a physically unclonable function (PUF), at the first node. In certain embodiments, the node fingerprint is generated using helper data 116, as well. In addition, the first network authority 102*a* accesses or determines an expected fingerprint it expects to receive back from the node 110 being challenged, where the expected fingerprint is based on the first challenge that was sent to the node 110 and on characteristic data information (e.g., respective stored characteristic data 104), wherein the first network authority 102*a* accesses the characteristic data information from a location that is independent of and separate from the node 110, such as the first database of enrolled nodes 118*a*, which can include stored PUF data for the respective PUF 112 of the node 110 (block 535). In certain embodiments, the expected fingerprint is generated using helper data 116, as well.

In some embodiments, the first network authority 102*a* determines the expected fingerprint on the fly, based on the first challenge it sends to the node 110 and the characteristic data information 104 (also referred to herein as simply as "characteristic data") it has stored about the PUF 112 at the node 110. In some embodiments, if the first network authority 102*a* knows in advance the challenge it will send to a given node 110, the first network authority 102*a* can determine the respective expected fingerprint for the node 110 in advance of sending the first challenge, or at the same time as sending the first challenge, etc., based on the first challenge to be sent or being sent and on the stored characteristic data 104 for the respective PUF 112 that it has stored in the first database of enrolled nodes 118.

In block 540, the first network authority 102*a* receives the response, in the form of a node fingerprint, sent by the node 110, in response to the first challenge sent to the node 110. This node fingerprint from the node 110 is in the form of a fingerprint or signature, for the node 110, and the node 110 generates the response fingerprint to the first challenge based on the first challenge itself (including any nonce it contains) and on the response of the node's respective PUF 112 to the first challenge. In certain embodiments, the PUF 112 of the node 110 will produce a unique response to the first challenge (see FIG. 6), which corresponds to unique characteristic data of the PUF 112. In block 545, the first network authority 102*a* determines, based on the received node fingerprint and on the first challenge sent to the node 110, whether the node fingerprint matches the expected fingerprint determined in block 535. If the received node fingerprint matches the expected fingerprint (block 545 answer is YES), then the first network authority 102*a* adds a status of "authenticated" to a node status for the respective node 110 (block 550), where the node status is stored in the first database of enrolled nodes 118*a*. The received node fingerprint matching the expected fingerprint, at block 545, means that the PUF 112 of the node 110 is trusted by the first network authority 102*a*, so the node 110 will be authenticated and, as described further below for blocks 552-560, a pair of symmetric keys 122, 122' can be generated based in part on that trusted PUF 112.

If at block 545, the received node fingerprint does not match the expected fingerprint (answer is "NO" at block 545), then the node 110 seeking access to the first network 200*a* is not authentic and is determined/defined to be a "rogue node". Rogue nodes are denied access to the network. Thus, processing moves to run the prune process of FIG. 8 (discussed further herein) (block 570) to remove rogue node and optionally roll out or otherwise re-establish new keys to all authenticated nodes (to FIG. 8 block 820). Optionally, as part of block 570, the first network authority 102*a* can log access attempt and/or issue alert message (e.g., to another entity) about the attempted access by a rogue node. Optionally, as part of block 570, the first network authority can roll out or otherwise re-establish new symmetric keys to all enrolled nodes 110 (this is also discussed further herein as part of FIG. 8).

Referring back to block 550, after a node 110 is authenticated to the first network 200*a* and first network authority 102*a*, the first network authority 102*a* sends a second challenge to the node 110, with optional nonce (block 552), where the second challenge is used for key generation at both the first network authority 102*a* and the node 110, as explained below. The first network authority 102*a* uses its stored characteristic data 104 about the PUF 112 of the node 110, along with its second challenge sent to the node 110, and (optionally) helper data 116 (which is part of the characteristic data) to generate one key 122 of a symmetric key pair 122, 122' (block 554). Similarly, in block 555, the authenticated node 110 that sent the access request uses the received second challenge and corresponding characteristic data about its PUF 112, to generate the second symmetric key 122'. The corresponding characteristic data can be obtained from the PUF 112 and relates to at least one unique characteristic of the PUF 112, where the node 110 can obtain the corresponding characteristic data from its respective PUF 112, in some embodiments, by challenging the PUF 112 in accordance with the second challenge), Optionally helper data 116 can be used to help ensure that the unique characteristic data of the PUF 112 is close enough to the stored characteristic data information 104 to ensure that the a corresponding symmetric key 122'*at* the node 110 is identical to the stored symmetric key 122 at the first network authority 102*a*.

Further, in certain embodiments, the corresponding characteristic data that the node 110 obtains about its PUF 112, to create the second key of the pair of symmetric keys, is actually identical to the characteristic data 104 that the first network authority 102*a* uses (in block 554). Thus, the symmetric key 122' created at the node 110 should be identical to the symmetric key 122 generated and stored for that node 110 at the first network authority 102*a* in its first database of current symmetric keys 120*a*. The symmetric keys 122, 122' are able to be computed independently, yet be identical because both symmetric keys 122, 122' are generated using the same challenge information and the same characteristic information associated with the PUF 112. Further, although all of the information needed to generate these symmetric keys 122, 122' can be found at each of the node 110 and the first network authority 102a, the full amount of information needed to generate a symmetric key 122, 122' is never shared between the node 110 and the first network authority 102a, which helps to ensure security. This dependency between the first network authority 102a and the node 110 and the node's PUF 112 (assisted by helper data 116, if needed) helps to prevent reverse engineering of the PUF 112 responses from simply looking at the helper data in the network authority, or looking at a challenge by itself, for example.

This, in block 560, the first network authority 102a allows the authenticated node 110 that sent the access request query (which node 110 now has "authenticated" status and has one of a pair of symmetric keys 122, 122'), to access the first network 200a. The first network authority 102a changes the status of the node to "connected" once the node is actually connected. The node 110 can access the first network 200a so long as it uses the correct symmetric key 122'.

The first network authority 102a can track a status of "connected," or "disconnected," for an authenticated, enrolled node, and can allow the node 110 to have access to the first network 200a, and it first network resources 124a, so long as it the node 110 uses the correct symmetric key 122' (block 560). Optionally, in certain embodiments, if as node 110 is authenticated, connected, and using the correct symmetric key 122', the first network authority 102a may permit a given node 110 to communicate with other authenticated and connected network nodes 110, so long as the first network authority 102a can serve as an intermediary to ensure each node receives communications encrypted with the correct symmetric key for that node 110 (and optionally to communicate with other authenticated, connected network nodes, via the first network authority 102a). In certain embodiments, for communication between nodes 110, the first network authority 102a also can distribute shared keys to all authenticated nodes 110. If a rogue node is detected, the first network authority 102a, changing the shared key protects all nodes 110. Communications between the authenticated node 110 and the first network authority 102a continue in accordance with the ongoing network operation process of FIG. 9 (block 575), until the node 110 disconnects from the network. As will be understood, blocks 505 through 570 can be repeated for each attempted access to the first network 200a by other nodes 110 (block 575).

Advantageously, in certain embodiments, the sending of the first challenge by the first network authority 102a and the node 110 responding to the first challenge, along with authentication and generation of symmetric keys, is all done automatically and/or autonomously, without requiring user intervention or any human intervention or any other intervention, to choose a challenge, respond to a challenge, enter passwords, produce tokens, or perform any other auction to send the challenge, respond to the challenge, or analyze the whether the actual response to the challenge matches the expected response. This can allow devices to self-authenticate themselves automatically and securely to a computer network and to communicate securely over that network, while still helping the network to ensure that rogue devices are not able to join the network or be swapped in for legitimate devices that have been connected already.

FIG. 6 is a flowchart of a process 600 for authenticating a network node to a computer network, from the perspective of a network node 110, in accordance with one embodiment. Many of the blocks in FIG. 6 are corollaries to the blocks of FIG. 5, as will be understood; in addition, this process, like the process of FIG. 5, is explained using the first network 200a of FIG. 2, but this is not, of course, limiting. Further, the process 600 of FIG. 6 assumes that the node 110 seeking to access the first network 200a and to authenticate, does not currently have a valid key 122' to access the first network 200a. The node 110 can lack a valid key 122' for several reasons. For example, the node 110 may be enrolled but may never have attempted to access the first network 200a before, or the node 110 may be accessing the first network 200a but, during the time of access, the valid symmetric key 122' may inadvertently become corrupt, the valid symmetric key 122' may expire and become e an outdated key 122', the first network 200a may be configured to require a new key 122' from the node 110 for each session when a node 110 access the first network 200a, and/or the first network 200a may require one or more nodes 110 create new keys at periodic times, the first network 200a may require one or more nodes 110 to create new keys when there has been an intrusion attempt, etc. . . .

Another possibility for why a node 110 may not have a valid symmetric key 122', of course, is that the node 110 is a rogue node which will not be able to authenticate itself to the first network 200a, because it can never create a valid key 122'. Thus, optionally, in block 605, it is assumed that valid nodes 110 have been previously enrolled to the first network authority 102a, even if those valid nodes 110 do not now possess the correct key 122' to access the first network 200a. Issues with that are checked later in the process, as described below.

A node 110 seeking access to the first network 200s sends an access request to the first network authority 102a to attempt to authenticate the node 110 so as to join/access the first network 200a. In response to the access request, the node 110 receives a first challenge from the first network authority 102a (block 625). In response to the first challenge, the node 110 generates a first response fingerprint to the first challenge response based on the first challenge itself (optionally including nonce), data from the PUF 112 of the node, such as characteristic data 104 that the node obtains by performing a predetermined action on its PUF 112, as described elsewhere herein, and optionally helper data. The node 110 sends the first response fingerprint in response to the challenge (i.e., the fingerprint is part of a "challenge response") to the first network authority 102a (block 630). In block 635, the node 110 learns whether or not the first network authority 102a authenticates the node based on the response fingerprint it sent in response to the first challenge that the first network authority 102a sent. Learning about authentication can be overt in certain embodiments (e.g., the first network authority sends the node 110 a notification) or implied in certain embodiments based on behavior of the first network authority 102a (e.g., a second challenge is sent for key generation), as explained below. As shown in the example embodiment of FIG. 6, if the answer at block 635 was "YES", the node 110 learns it is authenticated by receiving a second challenge (block 637).

If the first network authority 102a does not authenticate based on the challenge response (answer at block 635 is "NO"), then several options are possible. In certain embodiments, a node 110 may be permitted to retry its authentication (with processing moving to block 615), and during the retry process, the node 110 may use its helper data 116 to help generate its first response to the first challenge from the first network authority 102a. This action may be applicable, for example, if environmental conditions at the node 110, or other conditions, are indicative that the response of its PUF 112 to the challenge, may not match previously stored characteristic data 104 for that PUF 112, due to environmental or other effects (e.g., electrical noise). Another option, in certain embodiments, may be a for the node 110 to contact the first network authority 102a (and/or for humans to get involved), to resolve an error that perhaps should not be an error, or to get enrolled (via FIG. 3) if for some reason the node 110 was never enrolled.

If retry is not permitted (or has taken place and still does not work), and if contacting the first network authority 102a is not applicable or does not work, the node 110 is defined to be rogue and is purged from network per FIG. 8 (to FIG. 8 block 820).

If the answer is "Yes" at block 635 (first network authority 102a authenticates the node 110), then the node 110 receives a second challenge (with optional nonce) from the network authority (block 637). With the second challenge, the node 110 is able to generate the node's respective one of the pair of symmetric keys 122', where the key 122' at the node 110 is generated based on the second challenge received at block 637 from the first network authority 102a, on the characteristic data of the node's PUF 112, and optionally (if needed) using helper data 116 (block 640). As part of block 640, the node 110 generates and stores its symmetric key 122' at the node 110. Because the status of the node 110 is now "authenticated" (block 645), and the node 110 has a valid symmetric key 122', the node 110, while connected, is allowed to access the first network 200a (and optionally to communicate with other nodes 110 having authenticated status) via the first network authority 102a) so long as the node 110 uses the correct symmetric key 645 Thus, the node 110 operates (block 650) in accordance with ongoing network operation (FIG. 9) so long as authenticated, able to respond to future challenges from the first network authority 102a, and continues to use the correct symmetric key 122', where the ongoing network operation continues until the node 110 disconnects from the first network 200a.

Figure 7:
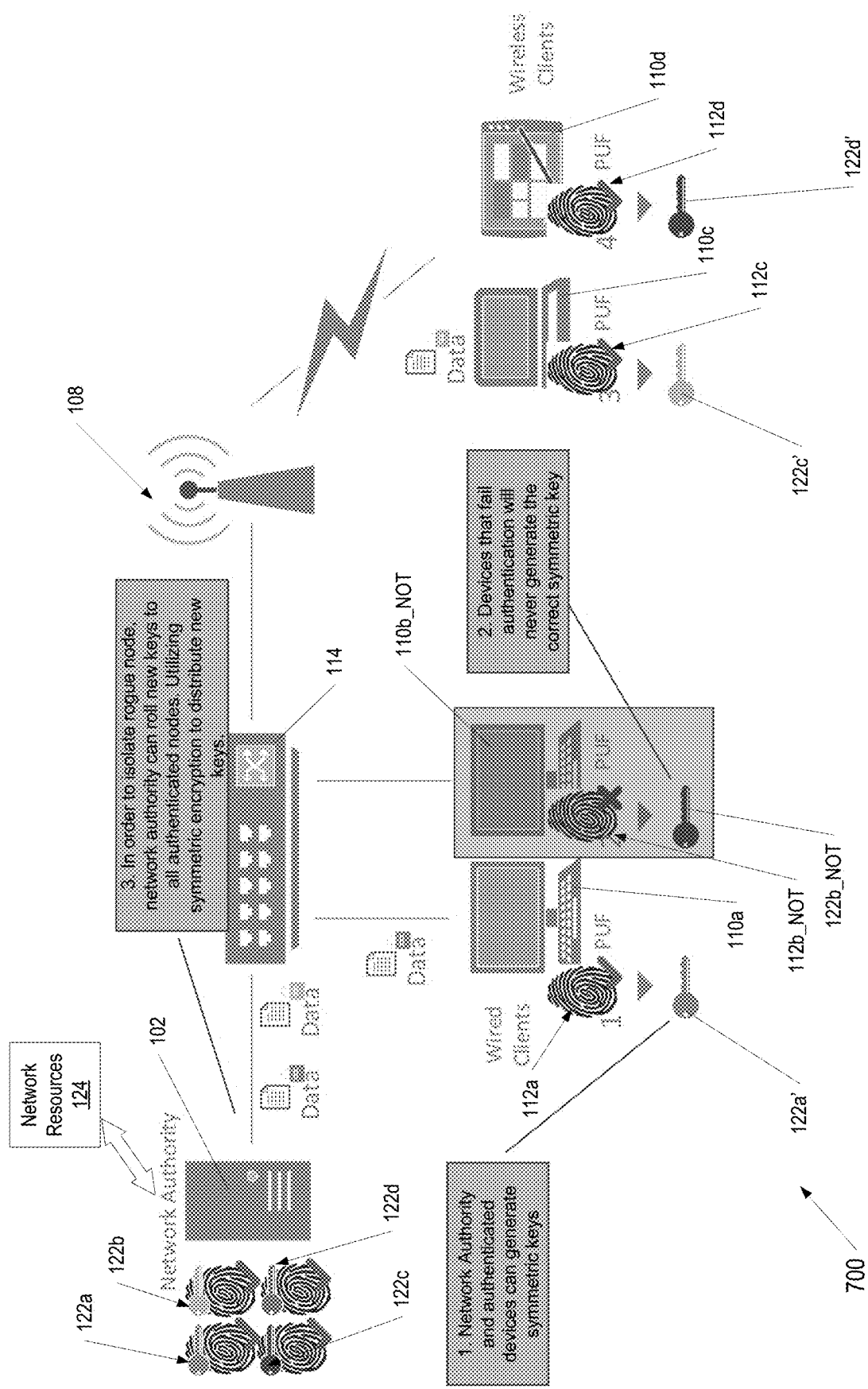
FIG. 7 is an illustrative block diagram showing the system of FIGS. 1 and 2 during the pruning process of FIG. 8 and ongoing network operation of FIG. 9, in accordance with one embodiment.

The processes 500 of FIGS. 5 and 600 of FIG. 6 each referenced the pruning process of FIG. 8, which is applicable if an unauthorized and/or rogue node 110 must be removed ("pruned") from the first network 200a. FIG. 7 is an illustrative block diagram showing the system of FIGS. 1 and 2 during the pruning process of FIG. 8 and ongoing network operation of FIG. 9, in accordance with one embodiment, and FIG. 8 is a flowchart of a method 800 for pruning a rogue node from a computer network, in accordance with one embodiment.

Referring first to FIG. 7, the illustration 700 depicts a high level view of what takes place during network pruning of rogue nodes 110 and other bad actors. As noted previously, the network authority 102 and authenticated devices (nodes) 110a, 110c, 110d can generate symmetric keys 122a', 122c', 122d', to match the corresponding symmetric keys 122a, 122b, 122c stored at the network authority 102, to enable the nodes 110a, 110c, 110d to access the network via wired access (via wireless network device 114) or wireless access 108. Devices that fail authentication, such as rogue node 110b_NOT, will never generate the correct symmetric key. For example, rogue node 110b_NOT has a key 122b_NOT that does not match the key 122b stored at the first network authority 102b for legitimate node b 110b (not shown in FIG. 7, because node 110b_NOT is attempting to impersonate legitimate node 110b).

In certain embodiments, to isolate rogue node 110b_NOT, the network authority 102 can roll out or otherwise re-establish new symmetric keys 122 to all authenticated nodes 110, e.g., using symmetric encryption, which effectively provides a cryptographic "lock out" of the rogue node 110b_NOT. In certain embodiments, the lock out can be extended to a physical disconnection from the network. Symmetric encryption provides and enables an independent secure channel to each authenticated node 110, from the network authority 102. As noted previously, in some embodiments, there can be communication between nodes 110 via symmetric encryption, with key management provided by the network authority 102.

FIG. 8, as noted above, provides a method 800 for pruning/removing a non-legitimate node 110 from the network. For consistency, the method of FIG. 8 (similar to those of FIGS. 3, 5 and 6) is described in connection with the first network 200a of FIG. 2. Referring to FIGS. 2 and 8, in block 805, it is assumed that the first network authority 102a is configured with one or more legitimate enrolled nodes 110, which have been enrolled with a process similar that of FIG. 3. In block 815, the first network authority 102a determined that at least one of following conditions exists with respect to a node that is either attempting to access the first network 200a or has been granted access to the first network 200a in the past, but an issue is detected (e.g., a node 110, such as Node_B_NOT 110b_NOT of FIG. 2) potentially is a rogue/unauthorized node) wherein one of the following conditions exists:

(a) the node 110 cannot authenticate itself per FIGS. 5-6;
(b) the node 110 is not enrolled to the first network 200a in accordance with FIG. 3
(c) the node 110 responds incorrectly or not at all to challenge sent to it from first network authority 102a (e.g., challenge sent during authentication or ongoing network operation);
(d) the node 110 does not use a valid/correct/non-expired symmetric key (e.g., a node 110 is using an invalid symmetric key, an incorrect symmetric key, an expired symmetric key, etc.)

As block 820 shows, certain blocks from other methods herein (e.g., block 570 of FIG. 5; block 655 of FIG. 6, and/or block 920 of FIG. 9, described further here) can lead to conditions of block 815 wherein a rogue node 110 or potentially rogue node 110 may need to be removed from the first network 200a. In block 825, the first network authority 102a terminates all network access/communications to/from potentially rogue node 110 and terminates all network communications to and between rogue node and all network nodes (block 825). Optionally, in block 830, the first network authority 102a can cause the rogue node to be physically disconnected from the first network 200a. In some embodiments, if a previously enrolled and authenticated node 110 starts to attempt to communicate using the wrong symmetric key 122', then it could indicate that something has been swapped or changed, where the replacement node 110 or replacement components of a node, no longer contain the previously enrolled PUF 112, and thus are no longer authorized for the system and must be disconnected from a given network.

In block 835, after the rogue node has been removed from the network, the first network authority 102a generates and rolls out new symmetric keys to all authenticated nodes 110, via symmetric encryption. (Block 815) There are various ways to roll out or otherwise re-establish new keys. For example, the first network authority 102a can instruct each authorized node 110 to change keys in a certain way. A bad actor even intercepting that communication, would only see the change to be made. For example, the first network authority could instruct a given node to perform a multi-step and/or complicated mathematical operation on a stored key to generate a new key, where one element of the multi-step mathematical operation relies on a different portion of the stored characteristic data 104 for the PUF 112 than was used for the previous key 122. A rogue node or other bad actor, even intercepting the communication containing this instruction to a given node 110, would not be able to use that information to generate a fake key to try and join the network 200, because the new key computation still would depend on a PUF contained within the device, which PUF 112 is unique and not cloneable. In certain embodiments, another way to "roll out" or "re-establish" new symmetric keys 122 is to send new challenges to all nodes 110 and/or re-authenticate all nodes 110.

Referring still to FIG. 8, after block 846, each node 110 is configured to resume ongoing network operation (see FIG. 9, described further below) and to permit network communications again, between authorized nodes 110 and the first network authority 102*a*, and between authorized nodes 110 via the network authority (block 840). Blocks 805-840 are repeated for each attempted access to the first network 200*a* by other nodes (block 845).

FIG. 9 is a flowchart of a method 900 for detecting and monitoring a computer network, during ongoing operation, to detect potential rogue nodes and rogue node operation, and optionally to periodically re-authenticate nodes, in accordance with one embodiment. Periodically re-authenticating one or more nodes 110 can help to ensure that a bad actor does not authenticate to a network 200 and then substitute or switch an insecure or unauthorized node to the "authorized," connection because the network will make that node authenticate again, be it immediately or during periodic and/or regular checks of nodes on the network.

FIG. 9, like FIG. 8, is discussed in connection with the system of FIG. 2, for consistency and simplicity. At the start of the method of FIG. 9 (block 905), the ongoing network operations are performed by the first network authority 102*a*, in accordance with current symmetric keys for each node 110, where the first network authority 102*a* is configured for ongoing monitoring for one or more predetermined conditions, such as monitoring for attempted access (per FIGS. 5-6), and optional further checks as discussed below. If any one or more predetermined conditions exist, the first network authority 102*a* is configured to take various types of actions in response to the existence of the one or more predetermined conditions.

For example, the ongoing monitoring, in certain embodiments, includes monitoring of communications between nodes 110 and other entities in the first network 200*a*, such monitoring communications between the nodes 110 and the first network authority 102*a* and/or monitoring communications between nodes 110. In certain embodiments, the first network authority 102*a* is configured to monitor communications. A check is made (block 910) to determine if any node 110 is communicating with the wrong symmetric key 122' (the symmetric key 122 stored at the first network authority 102*a*, e.g., in the first database of current symmetric keys 120*a*). The check of block 810 can take place periodically, randomly, continuously, etc., as required by a given implementation.

If the answer at block 910 is "Yes," then the first network authority 102*a* has detected that a node 110 is attempting to communicate with the first network 200*a* using the wrong symmetric key 122'. As noted in block 815 of FIG. 8, in some embodiments, there can be several reasons why a node 110 is using the wrong key 122', and, depending on if the node 110 was previously authenticated, previously enrolled, etc., the response by the first network authority 102*a* can vary. Thus, if the answer at block 910 is "Yes," a check is made at block 915 to see if the node 110 that is using the wrong key 122', is enrolled and/or authenticated to the first network authority 102*a*. If the node 110 is, in fact, enrolled and authenticated, (answer at block 915 is "Yes"), yet is still using the wrong key 122', then it is possible that a key 122' at the authenticated node 110 has become corrupted, whether intentionally or not. It also is possible that a rogue node 110 or another bad actor is attempting to impersonate an authenticated node 110. In certain embodiments, a solution for this it to re-authenticate the node 110 (block 925), e.g., per the process 500 of FIG. 5, or the first network authority 102*a* can resend a new symmetric key and/or send new challenges that a node 110 can use for key generation.

If the answer at block 915 is "No," then the node 110 that is communicating with the wrong symmetric key 122' (answer was "Yes" as block 910) is also not enrolled or authenticated to the first network authority 102*a*. This increases the likelihood that the node 110 attempting to access the first network 200*a* is not legitimate. The next step for this node in FIG. 9 is for it to be pruned (block 940), in accordance with the method 800 of FIG. 8, and then processing moves on to block 945 (discussed further below). In certain embodiments, nodes 110 that are legitimate and not enrolled yet, also may be pruned in accordance with block 840, but those nodes 110 can seek to become enrolled (in accordance with FIG. 3) by taking steps to ensure that the unenrolled node 110 obtain and install a remotely challengeable PUF 112 and then contact/notify the first network authority 102*a* to get the characteristic data 104 and other pertinent PUF 112 information (e.g., helper data 116), enrolled to the first database of enrolled nodes 118*a* at the first network authority 102*a*.

Referring again to block 910, if the answer at block 910 is "No," then, at the time the check at block 910 was done, no nodes 110 are communicating with the wrong symmetric key 122'. Processing moves to block 920. If the first network 200*a* is configured to require re-checking some or all nodes 110 by requiring any or all nodes 110, even if using correct symmetric key 122', to re-authenticate, then, at times during the operation of the first network 200*a* (e.g., periodically, randomly, upon the occurrence of other types of predetermined conditions, etc.), it will be the time to re-authenticate some or all nodes 110, and the answer at block 920 will be "Yes". For example, the first network 200*a* may, in certain embodiments, re-authenticate all nodes 110 at substantially the same time (e.g., all at once). The first network 200*a*, in some embodiments, may have a schedule for re-authenticating one or more nodes 110, wherein subsets of one or more nodes 110 may be re-authenticated at different times. Those of skill in the art will appreciate there can be multiple ways to configure how and when nodes 110 are re-authenticated.

If, however, it is not time to re-check nodes 110 (or, alternately, the first network 200*a* is not configured to require re-authentication), then the answer at block 920 will be "No". If the answer at block 920 is "No," then network operation continues for the first network 200*a*, with access for all authenticated nodes 110 (block 955), and processing moves back to block 905.

If the answer at block 920 is "Yes," (time to re-authenticate one or more nodes) then the first network authority 102*a* resends a challenge (i.e., sends a re-authentication challenge) to each authenticated node 110 that needs to be re-authenticated (essentially repeating blocks 525-575 of FIG. 5) (block 930). As part of that re-authentication (which also will include sending an additional challenge after authentication is established, as described in FIGS. 5-6), new symmetric keys 122, 122' may be generated and established at both the first network authority 102a and for each node 110 needing-re-authentication, such as by sending an updated and different challenge to those nodes.

The outcome of the re-authentication of block 930 is checked at block 935, where a check is made to see if all the nodes 110 for which re-authentication was attempted, were able to re-authenticate successfully. If the answer at block 935 is "No," then any nodes 110 that could not re-authenticate, are pruned in accordance with FIG. 8 (block 940) and processing continues to block 945. At block 945, if nodes 110 are still connected to the first network 200a (answer at block 945 is "Yes,"), then ongoing network operations continue (block 955) with access to the first network 200a for all authenticated nodes 110. Optionally, in certain embodiments, as part of ongoing network operation, the first network authority 102a may resend a challenge (for key generation) or resend new symmetric keys or otherwise instruct one or more nodes 110 to generate new symmetric keys 122', after each re-authentication action (block 950).

If the answer at block 945 is "No," then no nodes 110 are connected to the first network 200a, and the first network authority 102a waits for nodes to attempt to connect or re-connect (block 947) and processing flows to block 905.

The above-described embodiments are expected to be compatible with a wide variety of system nodes and types of PUFs, as noted above. Any of the embodiments described herein may be combined with and/or adapted to work with, the disclosures of any one or more of the following commonly assigned U.S. patents and patent applications, which are hereby incorporated by reference:

U.S. Pat. No. 10,445,531, entitled, "AUTHENTICATION SYSTEM AND METHOD" issued Oct. 15, 2019;

U.S. Pat. No. 10,452,872, entitled, "DETECTION SYSTEM FOR DETECTING CHANGES TO CIRCUITRY AND METHOD OF USING SAME," issued Oct. 22, 2019;

U.S. Patent Publication No. 20210192050, entitled, "SYSTEM VALIDATION BY HARDWARE ROOT OF TRUST (HROT) DEVICE AND SYSTEM MANAGEMENT MODE (SMM)," published Jun. 21, 2021;

U.S. Patent Publication No. 20190311126, entitled "CONTROLLING SECURITY STATE OF COMMERCIAL OFF THE SHELF (COTS) SYSTEM," and published Oct. 10, 2019; and U.S. Pat. No. 9,197,422, entitled, "SYSTEM AND METHOD FOR DIFFERENTIAL ENCRYPTION," issued Nov. 24, 2015.

Figure 10:
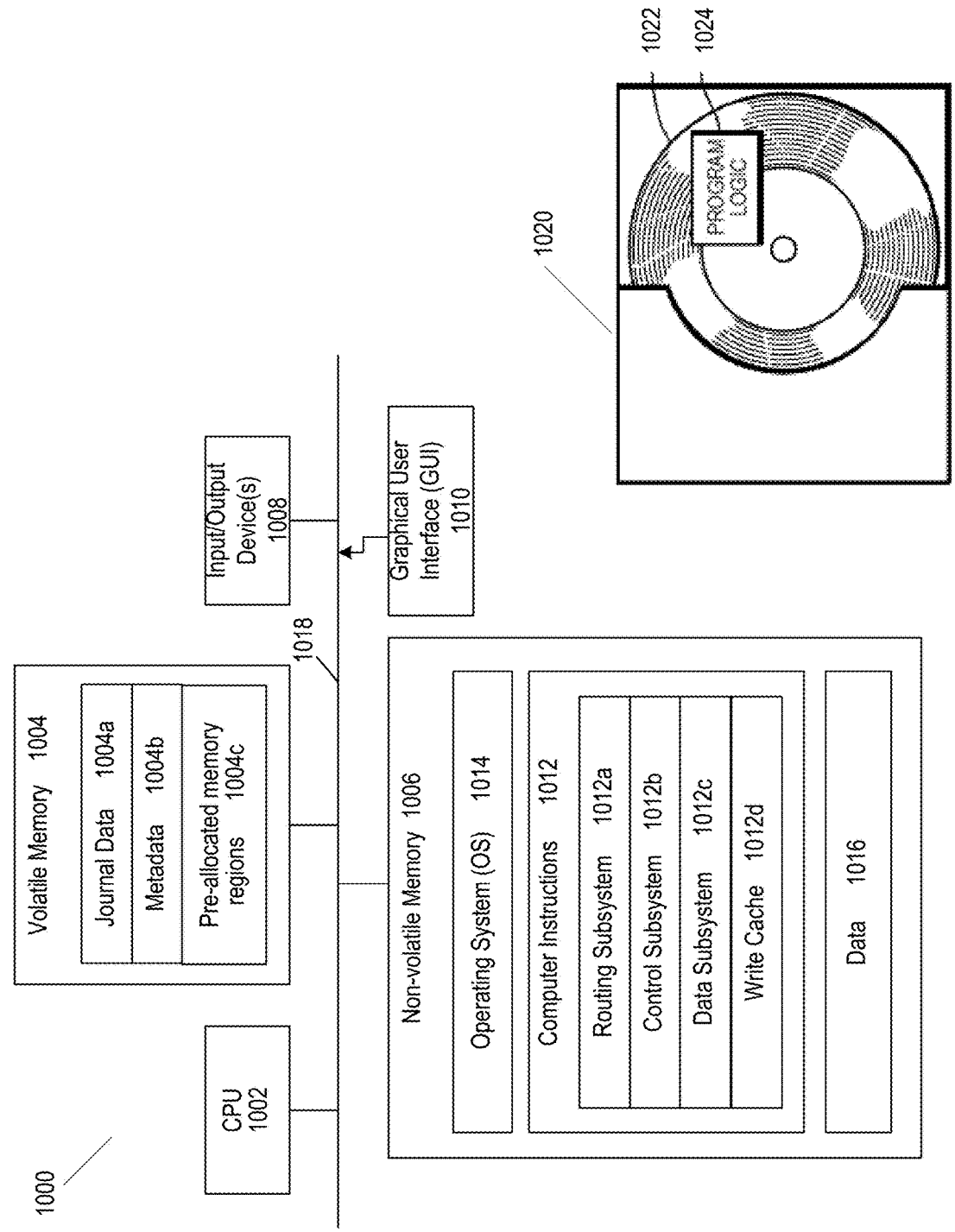
FIG. 10 is a block diagram of an exemplary computer system usable with at least some of the systems and apparatuses of FIGS. 1-9, in accordance with one embodiment.

FIG. 10 is a block diagram of an exemplary computer system 1000 usable with at least some of the systems and apparatuses of FIGS. 1-9, in accordance with one embodiment. The computer system 1000 of FIG. 10 is usable, in some embodiments, as the network authority 102 and/or as any one or more of the nodes 110, for example. Reference is made briefly to FIG. 10, which shows a block diagram of a computer system 1000 usable with at least some embodiments. The computer system 1000 also can be used to implement all or part of any of the methods, equations, and/or calculations described herein.

As shown in FIG. 10, computer system 1000 may include processor/central processing unit (CPU) 1002, volatile memory 1004 (e.g., RAM), non-volatile memory 1006 (e.g., one or more hard disk drives (HDDs), one or more solid state drives (SSDs) such as a flash drive, one or more hybrid magnetic and solid state drives, and/or one or more virtual storage volumes, such as a cloud storage, or a combination of physical storage volumes and virtual storage volumes), graphical user interface (GUI) 1010 (e.g., a touchscreen, a display, and so forth) and input and/or output (I/O) device 1008 (e.g., a mouse, a keyboard, etc.). Non-volatile memory 1006 stores, e.g., journal data 1004a, metadata 1004b, and pre-allocated memory regions 1004c. The non-volatile memory, 1006 can include, in some embodiments, an operating system 1014, and computer instructions 1012, and data 1016. In certain embodiment, the non-volatile memory 1006 is configured to be a memory storing instructions that are executed by a processor, such as processor/CPU 1002. In certain embodiments, the computer instructions 1012 are configured to provide several subsystems, including a routing subsystem 1012A, a control subsystem 1012b, a data subsystem 1012c, and a write cache 1012d. In certain embodiments, the computer instructions 1012 are executed by the processor/CPU 1002 out of volatile memory 1004 to implement and/or perform at least a portion of the systems and processes shown in FIGS. 1-9. Program code also may be applied to data entered using an input device or GUI 1010 or received from I/O device 1008.

The systems, architectures, and processes of FIGS. 1-9 are not limited to use with the hardware and software described and illustrated herein and may find applicability in any computing or processing environment and with any type of machine or set of machines that may be capable of running a computer program and/or of implementing a radar system (including, in some embodiments, software defined radar). The processes described herein may be implemented in hardware, software, or a combination of the two. The logic for carrying out the methods discussed herein may be embodied as part of the system described in FIG. 10. The processes and systems described herein are not limited to the specific embodiments described, nor are they specifically limited to the specific processing order shown. Rather, any of the blocks of the processes may be re-ordered, combined, or removed, performed in parallel or in serial, as necessary, to achieve the results set forth herein.

Processor/CPU 1002 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs). In some embodiments, the "processor" may be embodied in one or more microprocessors with associated program memory. In some embodiments, the "processor" may be embodied in one or more discrete electronic circuits. The "processor" may be analog, digital, or mixed-signal. In some embodiments, the "processor" may be one or more physical processors or one or more "virtual" (e.g., remotely located or "cloud") processors.

Various functions of circuit elements may also be implemented as processing blocks in a software program. Such software may be employed in, for example, one or more digital signal processors, microcontrollers, or general-purpose computers. Described embodiments may be implemented in hardware, a combination of hardware and software, software, or software in execution by one or more physical or virtual processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid-state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general-purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

For example, when the program code is loaded into and executed by a machine, such as the computer of FIG. 10, the machine becomes an apparatus for practicing one or more of the described embodiments. When implemented on one or more general-purpose processors, the program code combines with such a processor to provide a unique apparatus that operates analogously to specific logic circuits. As such a general-purpose digital machine can be transformed into a special purpose digital machine. FIG. 10 shows Program Logic 1024 embodied on a computer-readable medium 1020 as shown, and wherein the Logic is encoded in computer-executable code thereby forms a Computer Program Product 1022. The logic may be the same logic on memory loaded on processor. The program logic may also be embodied in software modules, as modules, or as hardware modules. A processor may be a virtual processor or a physical processor. Logic may be distributed across several processors or virtual processors to execute the logic.

In some embodiments, a storage medium may be a physical or logical device. In some embodiments, a storage medium may consist of physical or logical devices. In some embodiments, a storage medium may be mapped across multiple physical and/or logical devices. In some embodiments, storage medium may exist in a virtualized environment. In some embodiments, a processor may be a virtual or physical embodiment. In some embodiments, a logic may be executed across one or more physical or virtual processors.

For purposes of illustrating the present embodiments, the disclosed embodiments are described as embodied in a specific configuration and using special logical arrangements, but one skilled in the art will appreciate that the device is not limited to the specific configuration but rather only by the claims included with this specification. In addition, it is expected that during the life of a patent maturing from this application, many relevant technologies will be developed, and the scopes of the corresponding terms are intended to include all such new technologies a priori.

The terms "comprises," "comprising", "includes", "including", "having" and their conjugates at least mean "including but not limited to". As used herein, the singular form "a," "an" and "the" includes plural references unless the context clearly dictates otherwise. Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

Throughout the present disclosure, absent a clear indication to the contrary from the context, it should be understood individual elements as described may be singular or plural in number. For example, the terms "circuit" and "circuitry" may include either a single component or a plurality of components, which are either active and/or passive and are connected or otherwise coupled together to provide the described function. Additionally, terms such as "message" and "signal" may refer to one or more currents, one or more voltages, and/or or a data signal. Within the drawings, like or related elements have like or related alpha, numeric or alphanumeric designators. Further, while the disclosed embodiments have been discussed in the context of implementations using discrete components, including some components that include one or more integrated circuit chips), the functions of any component or circuit may alternatively be implemented using one or more appropriately programmed processors, depending upon the signal frequencies or data rates to be processed and/or the functions being accomplished.

Similarly, in addition, in the Figures of this application, in some instances, a plurality of system elements may be shown as illustrative of a particular system element, and a single system element or may be shown as illustrative of a plurality of particular system elements. It should be understood that showing a plurality of a particular element is not intended to imply that a system or method implemented in accordance with the disclosure herein must comprise more than one of that element, nor is it intended by illustrating a single element that the any disclosure herein is limited to embodiments having only a single one of that respective elements. In addition, the total number of elements shown for a particular system element is not intended to be limiting; those skilled in the art can recognize that the number of a particular system element can, in some instances, be selected to accommodate the particular user needs.

In describing and illustrating the embodiments herein, in the text and in the figures, specific terminology (e.g., language, phrases, product brands names, etc.) may be used for the sake of clarity. These names are provided by way of example only and are not limiting. The embodiments described herein are not limited to the specific terminology so selected, and each specific term at least includes all grammatical, literal, scientific, technical, and functional equivalents, as well as anything else that operates in a similar manner to accomplish a similar purpose. Furthermore, in the illustrations, Figures, and text, specific names may be given to specific features, elements, circuits, modules, tables, software modules, systems, etc. Such terminology used herein, however, is for the purpose of description and not limitation.

Although the embodiments included herein have been described and pictured in an advantageous form with a certain degree of particularity, it is understood that the present disclosure has been made only by way of example, and that numerous changes in the details of construction and combination and arrangement of parts may be made without departing from the spirit and scope of the described embodiments. Having described and illustrated at least some the principles of the technology with reference to specific implementations, it will be recognized that the technology and embodiments described herein can be implemented in many other, different, forms, and in many different environments. The technology and embodiments disclosed herein can be used in combination with other technologies. In addition, all publications and references cited herein are expressly incorporated herein by reference in their entirety. Individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the following claims.

What is claimed is:

1. A system for controlling access to a network, comprising:
   a processor;
   a memory in operable communication with the processor, the memory storing instructions thereon that when executed by the processor, cause the processor to:
   receive from a first node, a request to access a network;
   send to the first node a first challenge configured to elicit a first node fingerprint from the first node, the first node fingerprint based on the first challenge and on unique characteristic data of a physically unclonable function (PUF), at the first node;
   generate an expected fingerprint for the first node based on the first challenge and on characteristic data information associated with the unique characteristic data of the PUF, wherein the processor accesses the characteristic data information from a location that is independent of and separate from the first node;
   receive, from the first node, in response to the first challenge, the first node fingerprint;
   authenticate the first node to the network, to allow the first node to access to the network, if the first node fingerprint matches the expected fingerprint; and
   deny the first node any access to the network if the first node fingerprint does not match the expected fingerprint.

2. The system for controlling access to a network of claim 1, wherein if the first node fingerprint matches the expected fingerprint, the memory stores further instructions thereon that when executed by the processor, cause the processor to:
   send a second challenge to the first node; the second challenge configured to enable generation of a first pair of symmetric keys usable to encrypt communications between the first node and the network, the first pair of symmetric keys comprising a first symmetric key and a second symmetric key, wherein:
   the processor generates the first symmetric key based on the second challenge sent to the first node and on the characteristic data information that the processor accesses; and
   the second challenge is configured to enable the first node to use the second challenge to generate the second symmetric key based on the second challenge and on the unique characteristic data of the PUF at the first node, wherein the unique characteristic data of the PUF at the first node is close enough to the characteristic data information that the processor accesses to ensure that second symmetric key is identical to the first symmetric key.

3. The system for controlling access to a network of claim 2, wherein the memory stores further instructions thereon that when executed by the processor, cause the processor to monitor communications between the first node and the network and to revoke the access of the first node to the network if at least one of the following conditions exists:
   the first node sends a communication to the network that is not encrypted using the second symmetric key;
   the first node fails to re-authenticate itself to the network, in response to a re-authentication challenge; and
   the first node fingerprint no longer matches the expected fingerprint.

4. The system for controlling access to a network of claim 3, wherein revoking the access of the first node to the network comprises physically disconnecting the first node from the network.

5. The system for controlling access to a network of claim 2, wherein if a predetermined condition exists, the memory stores instructions thereon that when executed by the processor, cause the processor to establish a second pair of symmetric keys for communication with the first node, the second pair of symmetric keys configured to replace the first pair of symmetric keys, wherein the predetermined condition comprises at least one of:
   a second node requests access to the network and is denied access to the network;
   a second node fingerprint, for a second node, does not match an expected second node fingerprint for that second node;
   a second node, which has been authenticated to the network, fails to re-authenticate itself to the network, in response to a re-authentication challenge sent to the second node; and
   a second node, which has been authenticated to the network, sends a communication to the network using an incorrect respective symmetric key for that second node.

6. The system for controlling access to a network of claim 1, wherein at least one of the first challenge and second challenge comprises a nonce.

7. The system for controlling access to a network of claim 1 wherein the PUF comprises a strong PUF.

8. The system for controlling access to a network of claim 1, wherein the memory stores further instructions thereon that when executed by the processor, cause the processor to enroll the first node to the network in advance of receiving first node's request to access the network by storing a set of data associated with the first node, the set of data comprising the characteristic data information.

9. The system for controlling access to a network of claim 1, wherein the network is configured to use the expected fingerprint and the first node fingerprint to enable the first node to automatically self-authenticate, as required, to the network, without user intervention.

10. The system for controlling access to a network of claim 1, wherein at least one of the first node fingerprint and the expected fingerprint are generated using helper data that is associated with the PUF.

11. The system for controlling access to a network of claim 1, wherein the first node corresponds to an Internet of Things (IoT) device.

12. A method of controlling access to a network, comprising:
receiving from a first node, a request to access a network;
sending to the first node a first challenge configured to elicit a first node fingerprint from the first node, the first node fingerprint based on the first challenge and on unique characteristic data of a physically unclonable function (PUF), at the first node;
generating an expected fingerprint for the first node based on the first challenge and on characteristic data information associated with the unique characteristic data of the PUF, wherein the characteristic data information is accessed from a location that is independent of and separate from the first node;
receiving, from the first node, in response to the first challenge, the first node fingerprint;
authenticating the first node to the network, to allow the first node to access to the network, if the first node fingerprint matches the expected fingerprint; and
denying the first node any access to the network if the first node fingerprint does not match the expected fingerprint.

13. The method of controlling access to a network of claim 12, further comprising sending a second challenge to the first node; the second challenge configured to enable generating a first pair of symmetric keys usable to encrypt communications between the first node and the network, the first pair of symmetric keys comprising a first symmetric key and a second symmetric key, wherein:
the first symmetric key is generated based on the second challenge sent to the first node and on the characteristic data information; and
the second challenge is configured to enable the first node to use the second challenge to generate the second symmetric key based on the second challenge and on the unique characteristic data of the PUF at the first node, wherein the unique characteristic data of the PUF at the first node is close enough to the characteristic data information to ensure that second symmetric key is identical to the first symmetric key.

14. The method of controlling access to a network of claim 13, further comprising revoking the access of the first node to the network if at least one of the following conditions exists:
the first node sends a communication to the network that is not encrypted using the second symmetric key;
the first node fails to re-authenticate itself to the network, in response to a re-authentication challenge; and
the first node fingerprint no longer matches the expected fingerprint.

15. The method of controlling access to a network of claim 14, wherein revoking access of the first node to the network further comprising physically disconnecting the first node from the network.

16. The method of controlling access to a network of claim 13, further comprising:
establishing a second pair of symmetric keys for communication with the first node, the second pair of symmetric keys configured to replace the first pair of symmetric keys, if a predetermined condition exists, wherein the predetermined condition comprises at least one of:
a second node requests access to the network and is denied access to the network;
a second node fingerprint, for a second node, does not match an expected second node fingerprint for that second node;
a second node, which has been authenticated to the network, fails to re-authenticate itself to the network, in response to a re-authentication challenge sent to the second node; and
a second node, which has been authenticated to the network, sends a communication to the network using an incorrect respective symmetric key for that second node.

17. A method of authenticating to a network, comprising:
sending, from a first node, a request to access a network;
receiving at the first node a first challenge configured to elicit a first node fingerprint from the first node, the first node fingerprint based on the first challenge and on unique characteristic data of a physically unclonable function (PUF), at the first node;
sending the first node fingerprint to the network; and
receiving authentication of the first node to the network only if the first node fingerprint matches an expected fingerprint generated at the network, wherein the expected fingerprint is generated based on the first challenge and on characteristic data information associated with the unique characteristic data of the PUF, wherein the characteristic data information is accessed from a location that is independent of and separate from the first node.

18. The method of authenticating to a network of claim 17, further comprising:
receiving a second challenge at the first node; the second challenge configured to enable the first node to generate a second symmetric key, the second symmetric key being part of a first pair of symmetric keys usable to encrypt communications between the first node and the network, the first pair of symmetric keys comprising a first symmetric key used at the network and the second symmetric key used at the first node, wherein:
the second challenge is configured to enable the first node to use the second challenge to generate the second symmetric key based on the second challenge and on the unique characteristic data of the PUF at the first node; and
the unique characteristic data of the PUF at the first node is close enough to the characteristic data information to ensure that the second symmetric key is identical to the first symmetric key that is generated at the network based on the second challenge sent to the first node and on the characteristic data information.

19. The method of authenticating to a network of claim 18, wherein the first node receives from the network, a new second symmetric key to replace the second symmetric key that the first node generated, if a predetermined condition exists, wherein the predetermined condition comprises at least one of:
a second node requests access to the network and is denied access to the network;
a second node fingerprint, for a second node, does not match an expected second node fingerprint for that second node;

a second node, which has been authenticated to the network, fails to re-authenticate itself to the network, in response to a re-authentication challenge sent to the second node; and a second node, which has been authenticated to the network, sends a communication to the network using an incorrect respective symmetric key for that second node.

20. The method of authenticating to a network of claim 17, wherein the first node comprises an Internet of Things (IoT) device.

* * * * *

UNITED STATES PATENT AND TRADEMARK OFFICE
CERTIFICATE OF CORRECTION

PATENT NO. : 12,143,516 B2
APPLICATION NO. : 17/649422
DATED : November 12, 2024
INVENTOR(S) : Angelo et al.

It is certified that error appears in the above-identified patent and that said Letters Patent is hereby corrected as shown below:

On the Title Page

In item (71), in "Applicant", in Column 1, Line 1, delete "Waltham," and insert --Tewksbury,-- therefor In the Specification In Column 9, Line 49, delete "casy" and insert --easy-- therefor In Column 11, Line 52, delete "(ROT)"" and insert --(RoT)"-- therefor In Column 11, Line 58, delete "(HROT)"" and insert --(HRoT)"-- therefor In Column 11, Line 59, delete "ROT" and insert --RoT-- therefor In Column 11, Line 60, delete "ROT" and insert --RoT-- therefor In Column 11, Line 61, delete "HROT" and insert --HRoT-- therefor In Column 12, Line 2, delete "HROT" and insert --HRoT-- therefor In Column 12, Line 5, delete "HROT" and insert --HRoT-- therefor In Column 12, Line 7 (First Occurrence), delete "HROT" and insert --HRoT-- therefor In Column 12, Line 7 (Second Occurrence), delete "HROT" and insert --HRoT-- therefor In Column 12, Line 9, delete "HROT" and insert --HRoT-- therefor Signed and Sealed this
Sixth Day of January, 2026

John A. Squires
*Director of the United States Patent and Trademark Office*

In Column 12, Line 31, delete ""creating". "including"." and insert --"creating", "including",-- therefor In Column 16, Line 29, delete "112*c*)," and insert --112*e*),-- therefor In Column 19, Line 48, delete "12*b*." and insert --120*b*.-- therefor In Column 26, Line 55, delete "122'*at*" and insert --122' at-- therefor In Column 29, Line 57, delete "110*c*." and insert --110*c*,-- therefor In Column 33, Line 45, after "entitled", insert --,--

In Column 34, Line 16, delete "1012A," and insert --1012*a*,-- therefor